(12) United States Patent
Suemori et al.

(10) Patent No.: US 11,764,383 B2
(45) Date of Patent: Sep. 19, 2023

(54) SINGLE FUEL CELL, FUEL CELL MODULE, POWER GENERATION SYSTEM, HIGH-TEMPERATURE STEAM ELECTROLYSIS CELL AND METHODS FOR MANUFACTURING THE SAME

(71) Applicant: Mitsubishi Power, Ltd., Kanagawa (JP)

(72) Inventors: Shigenori Suemori, Tokyo (JP); Kenichi Hiwatashi, Kanagawa (JP); Shin Yoshida, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/722,797

(22) Filed: Apr. 18, 2022

(65) Prior Publication Data

US 2022/0246969 A1     Aug. 4, 2022

Related U.S. Application Data

(62) Division of application No. 16/651,174, filed as application No. PCT/JP2019/022593 on Jun. 6, 2019, now Pat. No. 11,335,935.

(30) Foreign Application Priority Data

Feb. 26, 2019    (JP) ................................. 2019-032909

(51) Int. Cl.
*H01M 8/1246*     (2016.01)
*H01M 8/2428*     (2016.01)
(Continued)

(52) U.S. Cl.
CPC ....... *H01M 8/1246* (2013.01); *H01M 4/8828* (2013.01); *H01M 4/8885* (2013.01);
(Continued)

(58) Field of Classification Search
None
See application file for complete search history.

(56) References Cited

U.S. PATENT DOCUMENTS 5,807,642 A    9/1998   Xue et al.
6,541,146 B1    4/2003   Xue et al.
(Continued)

FOREIGN PATENT DOCUMENTS

JP        05-234607       9/1993
JP     2008270203 A   *   11/2008
(Continued)

OTHER PUBLICATIONS

JP2008270203A—machine translation (Year: 2008).*
(Continued)

*Primary Examiner* — Haroon S. Sheikh
(74) *Attorney, Agent, or Firm* — Wenderoth, Lind & Ponack, L.L.P.

(57) ABSTRACT

A single fuel cell according to the present disclosure includes a power generation section, a power non-generation section which does not include the power generation section, and an oxygen-ion-insulating gas seal film arranged so as to cover the surface of the power non-generation section, and the gas seal film is configured by a structure formed by firing a material containing $MTiO_3$ (M: alkaline earth metal element) and metal oxide. The structure may include a first structure and a second structure which are different in composition, the first structure may include components derived from $MTiO_3$ in larger amounts than the second structure, the second structure may include a metal element contained in the metal oxide in a larger amount than the first structure, and the area ratio of the second structure in the structure may be not less than 1% and not more than 50%.

12 Claims, 21 Drawing Sheets

(51) Int. Cl.
*H01M 4/88* (2006.01)
*H01M 4/90* (2006.01)
*H01M 8/0282* (2016.01)
*H01M 8/04111* (2016.01)
*H01M 8/1213* (2016.01)
*H01M 8/12* (2016.01)

(52) U.S. Cl.
CPC ....... *H01M 4/9033* (2013.01); *H01M 8/0282* (2013.01); *H01M 8/04111* (2013.01); *H01M 8/1213* (2013.01); *H01M 8/2428* (2016.02); *H01M 2008/1293* (2013.01)

(56) References Cited

U.S. PATENT DOCUMENTS

| | | | |
|---|---|---|---|
| 6,562,505 | B1 | 5/2003 | Tsukuda et al. |
| 2006/0063659 | A1 | 3/2006 | Xue et al. |
| 2010/0323266 | A1 | 12/2010 | Matsumoto et al. |
| 2012/0107716 | A1 | 5/2012 | Yoshida et al. |
| 2013/0071770 | A1 | 3/2013 | Takata |
| 2019/0148757 | A1 | 5/2019 | Im et al. |

FOREIGN PATENT DOCUMENTS

| | | |
|---|---|---|
| JP | 2011-3376 | 1/2011 |
| JP | 2011-181291 | 9/2011 |
| JP | 2012-114074 | 6/2012 |
| JP | 2012-129165 | 7/2012 |
| JP | 2013-258157 | 12/2013 |
| JP | 2016-115628 | 6/2016 |
| JP | 2016-122545 | 7/2016 |
| JP | 2016-122645 | 7/2016 |
| JP | 2017-201601 | 11/2017 |
| KR | 10-2012-0021924 | 3/2012 |
| WO | 2018/034490 | 2/2018 |

OTHER PUBLICATIONS

Office Action dated Aug. 6, 2019 in corresponding Japanese Application No. 2019-032909 (with English translation).
International Search Report dated Aug. 13, 2019 in corresponding International Application No. PCT/JP2019/022593 (with English translation).
Written Opinion of the International Searching Authority dated Aug. 13, 2019 in corresponding International Application No. PCT/JP2019/022593 (with English translation).
A. E. Paladino, "Oxidation Kinetics of Single-Crystal $SrTiO_3$", Journal of the American Ceramic Society, vol. 48, Issue 9 (specifically p. 477, Fig. 3), Sep. 1965.
U. Brossmann et al., "Oxygen Diffusion in Nanocrystalline $ZrO_2$", Reviews on Advanced Materials Science, vol. 6, pp. 7-11, 2004.
Hiroaki Tagawa, "Solid Oxide Fuel Cell and the Global Environment", Agne Shofusha, Jun. 20, 1998, pp. 72-75 (specifically, 5.1.4 on p.73), cited in the specification of the present application at paragraph [0086].
R. A. De Souza, "Oxygen Diffusion in $SrTiO_3$ and Related Perovskite Oxides", Advanced Functional Materials, vol. 25, pp. 6326-6342, Aug. 6, 2015.
Lais D. Silva et al., "Sintering and crystallization of SrO—CaO—$B_2O_3$—$SiO_2$ glass-ceramics with different $TiO_2$ contents", Journal of Non-Crystalline Solids, vol. 473, pp. 33-40, Oct. 1, 2017.
Extended European Search Report dated Nov. 11, 2020, in corresponding Emopean Patent Application No. 19858626.5.

* cited by examiner

SINGLE FUEL CELL, FUEL CELL MODULE, POWER GENERATION SYSTEM, HIGH-TEMPERATURE STEAM ELECTROLYSIS CELL AND METHODS FOR MANUFACTURING THE SAME

TECHNICAL FIELD

The present disclosure relates to a single fuel cell, a fuel cell module, a power generation system, a high-temperature steam electrolysis cell, and methods for manufacturing the same, and particularly to a cell of a solid oxide fuel cell and a method for manufacturing the same.

BACKGROUND ART

A solid oxide fuel cell (SOFC) includes single elements (cells) each configured by an anode, an electrolyte, and a cathode, and interconnectors for electrically connecting adjacent cells to each other. Although a power generation voltage per cell is small, it is possible to increase the voltage and obtain a practical output by connecting a plurality of cells in series to form a cell stack.

In an SOFC, a flow path of fuel gas and a flow path of oxidizing agent are isolated from each other. Unnecessary mixing of fuel gas and oxidizing agent is not preferable. Therefore, a seal layer for preventing gas permeation may be provided at an appropriate place.

For example, if a gas permeation preventing function of the seal layer is insufficient, oxygen in the oxidizing agent may permeate through the seal layer and enter the fuel gas to oxidize the fuel gas, thereby reducing power generation efficiency. In PTL 1, a dense film is provided on a main surface and side end surfaces of a support substrate to prevent mixing of the fuel gas and the oxidizing agent.

A fuel cell described in PTL 2 includes an intermediate layer that is electrically connected to a power generation section. Here, the intermediate layer is formed of NiO+YSZ, NiO+$Y_2O_3$ or the like. However, there is a risk that Ni contained in the intermediate layer may be oxidized by oxygen gas, which deteriorates the electronic conductivity function of the intermediate layer. In PTL 2, an outer surface of the support substrate is covered with a dense seal layer to prevent mixing of the fuel gas on the support substrate side and air on an outer periphery of the dense seal layer.

CITATION LIST

Patent Literature

[PTL 1] Japanese Unexamined Patent Application, Publication No. 2016-122645
[PTL 2] Japanese Unexamined Patent Application, Publication NO. 2017-201601

SUMMARY OF INVENTION

Technical Problem

In PTL 1, an electrolyte is densified by using YSZ (yttria stabilized zirconia) to form a dense film. The dense film in PTL 1 has "high density to the extent that gas does not permeate therethrough", but has a limited effect of preventing penetration of oxygen ions because the dense film is formed of YSZ having oxygen ion permeability.

In PTL 2, a dense seal layer is formed of an electronic insulating material such as glass, brazing material, or ceramics. Examples of ceramics include CSZ (calcia stabilized zirconia), NiO (nickel oxide)+YSZ, NiO+$Y_2O_3$ (yttria), and MgO (magnesium oxide)+$MgAl_2O_4$ (magnesia alumina spinel), and all of CSZ, YSZ and $Y_2O_3$ have oxygen ion permeability. When a material having oxygen ion permeability is used, the effect of preventing penetration of oxygen ions is limited.

The present disclosure has been made in view of such circumstances, and has an object to provide a single fuel cell capable of preventing gas permeation, particularly penetration of oxygen ions, a fuel cell module and a power generation system including the single fuel cell, and a high-temperature steam electrolysis cell, and methods for manufacturing the same.

Solution to Problem

In order to solve the above problem, a single fuel cell, a fuel cell module, a power generation system, a high-temperature steam electrolysis cell and methods for manufacturing the same adopt the following solutions.

A first aspect of the present disclosure provides a single fuel cell comprising a power generation section in which an anode, an electrolyte, and a cathode are stacked, a power non-generation section that does not include the power generation section, and an oxygen-ion-insulating gas seal film arranged so as to cover at least a part of a surface of the power non-generation section, wherein the gas seal film comprises a structure formed by firing a material containing $MTiO_3$ (M: alkaline earth metal element) and metal oxide.

When a material obtained by adding metal oxide to $MTiO_3$ is fired, a structure including a first structure and a second structure is formed. The first structure contains M and Ti derived from $MTiO_3$ as main components. The second structure contains a metal contained in the metal oxide in a larger amount than the first structure, and contains M and Ti derived from $MTiO_3$. A second structure component has a lower melting point than a first structure component. Therefore, a liquid phase occurs during a firing step and infiltrates into the first structure. As a result, rearrangement, dissolution, reprecipitation, and the like of the first structure occur, and densification of the gas seal film is promoted.

In addition, since the melting point decreases as the second structure increases, a dense film can be obtained even by firing at a low temperature. In general, the gas seal film is integrally fired together with a base material serving as a base. If a dense film can be obtained at a low temperature, it will lead to protection of the base material.

The gas seal film formed by firing the material in which metal oxide is added to $MTiO_3$ may have low electronic conductivity and may be insulating. When the gas seal film is used to prevent gas leakage only, electronic conductivity may not be necessary. Such a gas seal film is suitably arranged at a place where electronic conductivity is unnecessary. By making the gas seal film electronically insulating, a short-circuit between power generation sections can be prevented.

The gas seal film formed by firing the material in which metal oxide is added to $MTiO_3$ is an oxygen-ion-insulating film. Therefore, penetration of oxygen ions can be more reliably prevented than a gas seal film formed of a material having high oxygen-ion permeability such as YSZ. Here, the term "oxygen-ion-insulating" means that oxygen ion permeability is zero, or oxygen ions are less permeable than at least stabilized zirconia.

The structure includes a first structure and a second structure that are different in composition, the first structure contains components derived from the $MTiO_3$ in larger amounts than the second structure, the second structure contains a metal element contained in the metal oxide in a larger amount than the first structure, and an area ratio of the second structure in the structure is not less than 1% and not more than 50%.

The gas seal film in which the second structure has an area ratio of 1% or more has a low open porosity and is sufficiently dense. Therefore, gas leakage can be prevented by providing the aforementioned gas seal film in the power non-generation section. However, when the area ratio of the second structure is too high, a crack occurs in the gas seal film due to a difference in thermal expansion between the support substrate and the underlayer film, and gas permeation occurs. Therefore, it is preferable that the area ratio of the second structure is not less than 1% and not more than 50%.

A second aspect of the present disclosure provides a single fuel cell comprising a power generation section in which an anode, an electrolyte, and a cathode are stacked, a power non-generation section that does not include the power generation section, and an oxygen-ion-insulating gas seal film arranged so as to cover at least a part of a surface of the power non-generation section, wherein the gas seal film comprises a structure formed by firing a material containing $M_{(1+x)}TiO_3$ (M: alkaline earth metal element, 0<x) or $MTi_{(1+y)}O_3$ (M: alkaline earth metal element, 0<y), and metal oxide.

The gas seal film defined in the second aspect has low oxygen-ion permeability. As a result, penetration of oxygen ions can be prevented. Furthermore, the gas seal film using $M_{(1+x)}TiO_3$ or $MTi_{(1+y)}O_3$ has low electronic conductivity. Such a gas seal film is suitably applied to a place where electronic conductivity is unnecessary.

The second structure is formed by firing a material in which metal oxide is added to $M_{(1+x)}TiO_3$ or $MTi_{(1+y)}O_3$ under a state where M or Ti is excessive. This influence enhances sinterability between first structures, and forms a dense structure having a reduced open porosity. Gas leakage can be prevented by covering the power non-generation section with the gas seal film having such a structure.

Furthermore, the inventors of the present application have conducted intensive studies, and as a result, have obtained knowledge that the second structure contains M or Ti derived from $M_{(1+x)}TiO_3$ or $MTi_{(1+y)}O_3$, and the content ratio of the second structure is different from that of the first structure. This knowledge suggests that the first structure may become a structure deficient in M or Ti. Such a structure loses stability and becomes less reliable. In the above disclosure, by adding M or Ti in excess, a state where M or Ti is insufficient in the first structure is mitigated, and a film with improved reliability can be obtained.

In the aforementioned second aspect, it is preferable that the structure includes a first structure and a second structure that are different in composition, the first structure contains components derived from $M_{(1+x)}TiO_3$ or components derived from $MTi_{(1+y)}O_3$ in larger amounts than the second structure, the second structure contains a metal element contained in the metal oxide in a larger amount than the first structure, and an area ratio of the second structure in the structure is not less than 1% and not more than 50%.

The gas seal film in which the second structure has the area ratio of 1% or more has a low open porosity and is dense. Therefore, gas leakage can be prevented by providing the gas seal film as described above in the power non-generation section. However, when the area ratio of the second structure exceeds 50%, a crack occurs in the gas seal film due to a difference in thermal expansion between the support substrate and the underlayer film, and gas permeation occurs.

In the first and second aspects, by arranging the gas seal film on the surface of the power non-generation section which does not include the power generation section, permeation of oxygen ions at an undesired location can be prevented without inhibiting permeation of gas which is required for power generation.

In the first and second aspects, the power non-generation section includes a lead film that may be electrically connected to the power generation section at an end portion, the gas seal film may be arranged so as to cover at least a part of a surface of the lead film.

In the first and second aspects, the power non-generation section may include an interconnector that electrically connects the power generation sections to each other, and the gas seal film may be arranged so as to cover at least a part of a surface of the interconnector.

In the first and second aspects, the power non-generation section may include a lead film electrically connected to the power generation section at an end portion, an interconnector for electrically connecting the power generation sections to each other, and a portion other than the lead film and the interconnector, and the gas seal film may be arranged so as to cover at least a part of a surface of the portion other than the lead film and the interconnector.

In the first and second aspects, the alkaline earth metal element is any one of Mg, Ca, Sr, and Ba.

In the first and second aspects, the metal oxide is preferably any one of $B_2O_3$, $Al_2O_3$, $Ga_2O_3$, $In_2O_3$, $Tl_2O_3$, $Fe_2O_3$, $Fe_3O_4$, MgO, NiO, and $SiO_2$.

The present disclosure provides a fuel cell module comprising a plurality of single fuel cells each of which includes an anode, an electrolyte, and a cathode and is described in the first aspect or the second aspect, a fuel gas supply pipe for supplying fuel gas to the anodes, and an oxidant gas supply pipe for supplying an oxidant gas to the cathodes of the plurality of single fuel cells.

The present disclosure provides a power generation system comprising the aforementioned fuel cell module, and rotating equipment for generating rotational power by using an exhaust fuel gas and an exhaust oxidant gas that are exhausted from the fuel cell module, wherein the fuel cell module is supplied with the oxidant gas compressed by using the rotational power, and the fuel cell module generates electric power by using the fuel gas and the compressed oxidant gas.

The rotating equipment comprises a gas turbine or a turbocharger.

In the fuel cell module and the power generation system, deterioration in power generation performance caused by gas leakage is reduced as compared with conventional products in which YSZ or the like is used as a gas seal film.

A third aspect of the present disclosure provides a method of manufacturing a single fuel cell including a power generation section in which an anode, an electrolyte, and a cathode are stacked, and a power non-generation section that does not contain the power generation section, the method comprising: coating, on a surface of the power non-generation section, slurry of a material containing $MTiO_3$ (M: alkaline earth metal element) and metal oxide that is added in an amount of 3 mol % or more to the $MTiO_3$, and then firing the slurry to form an oxygen-ion-insulating gas seal film.

By adding 3 mol % or more of the metal oxide to $MTiO_3$, the area ratio of the second structure in the structure after firing can be set to 1% or more. The gas seal film in which the second structure has the area ratio of 1% or more has a low open porosity and is dense. Therefore, gas leakage can be prevented by providing the gas seal film as described above in the power non-generation section.

A fourth aspect of the present invention provides a method of manufacturing a single fuel cell including a power generation section in which an anode, an electrolyte, and a cathode are stacked, and a power non-generation section that does not contain the power generation section, the method comprising:
coating slurry of a material containing $M_{(1+x)}TiO_3$ (M: alkaline earth metal element, 0<x) or $MTi_{(1+y)}O_3$ (M: alkaline earth metal element, 0<y) and metal oxide on a surface of the power non-generation section, and then firing the slurry to form an oxygen-ion-insulating gas seal film.

The gas seal film defined in the fourth aspect has low oxygen-ion permeability. As a result, leakage of oxygen ions can be prevented. Furthermore, the gas seal film using $M_{(1+x)}TiO_3$ or $MTi_{(1+y)}O_3$ has low electronic conductivity. Such a gas seal film is suitably applied to a place where electronic conductivity is unnecessary.

The second structure is formed by firing a material in which metal oxide is added to $M_{(1+x)}TiO_3$ or $MTi_{(1+y)}O_3$ in a state where M or Ti is excessive. This influence enhances sinterability between the first structures, and forms a dense structure in which the open porosity is reduced. Gas leakage can be prevented by covering the power non-generation section with the gas seal film having such a structure.

In the fourth aspect, the metal oxide may be added in an amount of 3 mol % or more to the $M_{(1+x)}TiO_3$ or the $MTi_{(1+y)}O_3$.

By adding 3 mol % or more of metal oxide to $MTiO_3$, the area ratio of the second structure in the structure after firing can be set to 1% or more. The gas seal film in which the second structure has the area ratio of 1% or more has a low open porosity and is dense. Therefore, gas leakage can be prevented by providing the gas seal film as described above in the power non-generation section.

In the third and fourth aspects, by arranging the gas seal film on the surface of the power non-generation section which does not include the power generation section, permeation of oxygen gas and oxygen ions at an undesired location can be prevented without inhibiting permeation of a gas required for power generation.

In the third and fourth aspects, the power non-generation section may include a lead film electrically connected to the power generation section at an end portion, and the gas seal film may be arranged so as to cover at least a part of a surface of the lead film.

In the third and fourth aspects, the power non-generation section may include an interconnector that electrically connects the power generation sections to each other, and the gas seal film may be arranged so as to cover at least a part of a surface of the interconnector.

In the third and fourth aspects, the power non-generation section may include a lead film electrically connected to the power generation section at an end portion, an interconnector for electrically connecting the power generation sections to each other, and a portion other than the lead film and the interconnector, and the gas seal film may be arranged so as to cover at least a part of a surface of the portion other than the lead film and the interconnector.

In the third and fourth aspects, the alkaline earth metal element is preferably any one of Mg, Ca, Sr, and Ba.

A fifth aspect of the present disclosure provides a high-temperature steam electrolysis cell comprising: a hydrogen generation section in which an anode, an electrolyte, and a cathode are stacked; a hydrogen non-generation section that does not include the hydrogen generation section; and an oxygen-ion-insulating gas seal film arranged so as to cover at least a part of a surface of the hydrogen non-generation section, wherein the gas seal film comprises a structure formed by firing a material containing $MTiO_3$ (M: alkaline earth metal element) and metal oxide.

A sixth aspect of the present invention provides a high-temperature steam electrolysis cell comprising: a hydrogen generation section in which an anode, an electrolyte, and a cathode are stacked; a hydrogen non-generation section that does not include the hydrogen generation section; and an oxygen-ion-insulating gas seal film arranged so as to cover at least a part of a surface of the hydrogen non-generation section, wherein the gas seal film comprises a structure formed by firing a material containing $M_{(1+x)}TiO_3$ (M: alkaline earth metal element, 0<x) or $MTi_{(1+y)}O_3$ (M: alkaline earth metal element, 0<y), and metal oxide.

In the fifth and sixth aspects, the structure may include a first structure and a second structure that are different in composition, the first structure may contain components derived from the $MTiO_3$ in larger amounts than the second structure, and the second structure may include a metal element contained in the metal oxide in a larger amount than the first structure, and an area ratio of the second structure in the structure may be not less than 1% and not more than 50%.

A seventh aspect of the present invention provides a method of manufacturing a high-temperature steam electrolysis cell including a hydrogen generation section in which an anode, an electrolyte, and a cathode are stacked, and a hydrogen non-generation section that does not include the hydrogen generation section, the method comprising:
coating, on a surface of the hydrogen non-generation section, slurry of a material containing $MTiO_3$ (M: alkaline earth metal element) and metal oxide that is added in an amount of 3 mol % or more to the $MTiO_3$, and then firing the slurry to form an oxygen-ion-insulating gas seal film.

An eighth aspect of the present invention provides a method of manufacturing a high-temperature steam electrolysis cell including a hydrogen generation section in which an anode, an electrolyte, and a cathode are stacked, and a hydrogen non-generation section that does not include the hydrogen generation section, the method comprising:
coating, on a surface of the hydrogen non-generation section, slurry of a material containing $M_{(1+x)}TiO_3$ (M: alkaline earth metal element, 0<x) or $MTi_{(1+y)}O_3$ (M: alkaline earth metal element, 0<y) and metal oxide, and then firing the slurry to form an oxygen-ion-insulating gas seal film.

Advantageous Effects of Invention

The single fuel cell and the high-temperature steam electrolysis cell which have the gas seal film according to the present disclosure are dense and can prevent gas leakage, and have low oxygen ion permeability, so that deterioration caused by penetration of oxygen ions can be prevented.

DESCRIPTION OF EMBODIMENTS

Hereinafter, embodiments of a single fuel cell, a fuel cell module, a power generation system, and methods of manufacturing the same according to the present disclosure will be described with reference to the drawings.

First Embodiment

In the following description, for convenience of description, the positional relationship of respective components described with expressions "up" and "down" on paper surface indicates a vertically upper side and a vertically lower side, respectively. Also, in the present embodiment, in a case where the same effect can be obtained between an up-and-down direction and a horizontal direction, an up-and-down direction on paper surface is not necessarily limited to a vertically up-and-down direction, and the up-and-down direction on paper surface may correspond to, for example, a horizontal direction orthogonal to a vertical direction.

Figure 1:
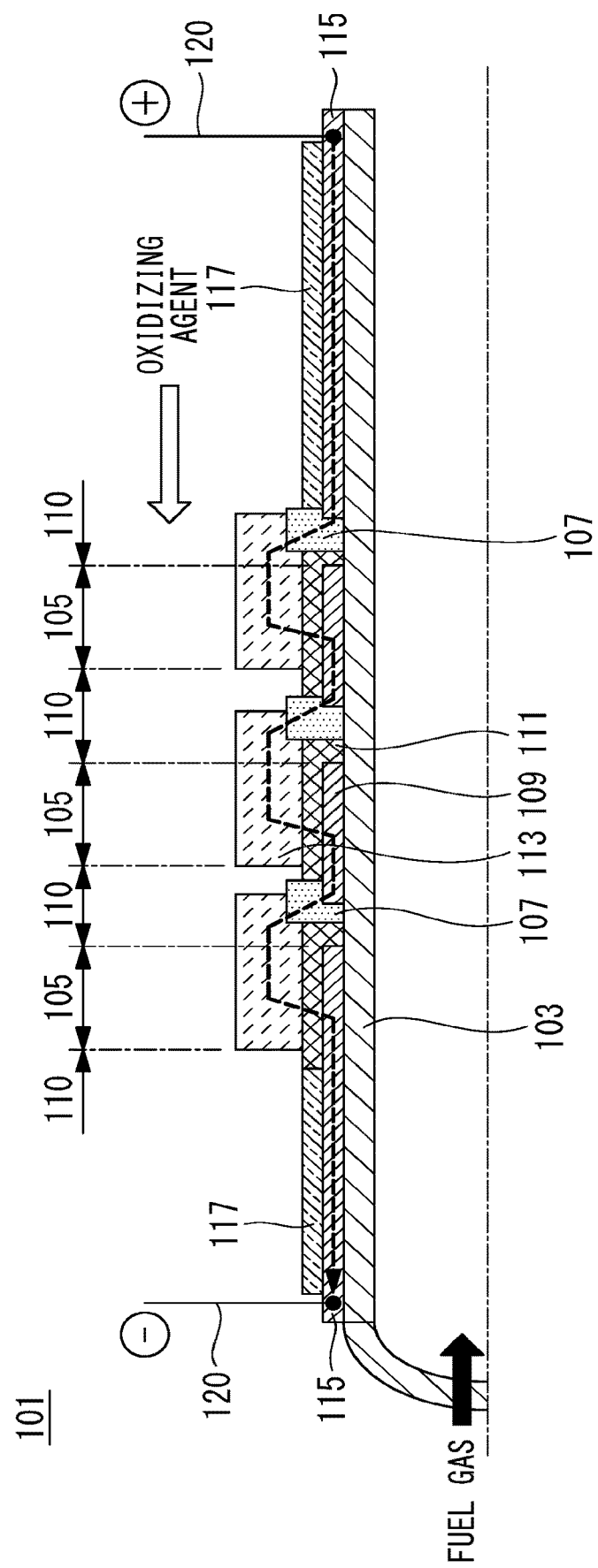
FIG. 1 is a diagram showing an aspect of a single fuel cell according to the first embodiment of the present disclosure.

A cylindrical single fuel cell using a substrate tube will be described as an example according to the present embodiment with reference to FIG. 1. Here, FIG. 1 shows an aspect of the single fuel cell according to the present embodiment.

A single fuel cell 101 includes a cylindrical substrate tube 103, a plurality of power generation sections 105 formed on the outer peripheral surface of the substrate tube 103, and power non-generation sections 110 each formed between adjacent power generation sections 105. The power generation section 105 is configured by stacking an anode 109, an electrolyte 111, and a cathode 113. The single fuel cell 101 includes a lead film 115 which is electrically connected via an interconnector 107 to a cathode 113 of a power generation section 105 formed at one end of most distal ends in an axial direction of the substrate tube 103 out of the plurality of power generation sections 105 formed on the outer peripheral surface of the substrate tube 103, and a lead film 115 which is electrically connected to an anode 109 of a power generation section 105 formed at the other end of the most distal ends.

Further, in the present embodiment, gas seal films 117 are arranged so as to cover at least a part of the surfaces of the power non-generation sections 110. In the single fuel cell 101, the "power non-generation section" means a region which does not contain the power generation section 105 in which three phases of the anode 109, the electrolyte 111 and the cathode 113 are stacked. In FIG. 1, gas seal films 117 are provided on the upper surfaces of the lead films 115 at both end portions of the single fuel cell 101, in other words, on the surfaces of the lead films 115 which are opposite to the substrate tube 103. A current collecting member 120 is connected to the lead films 115.

Figure 2:
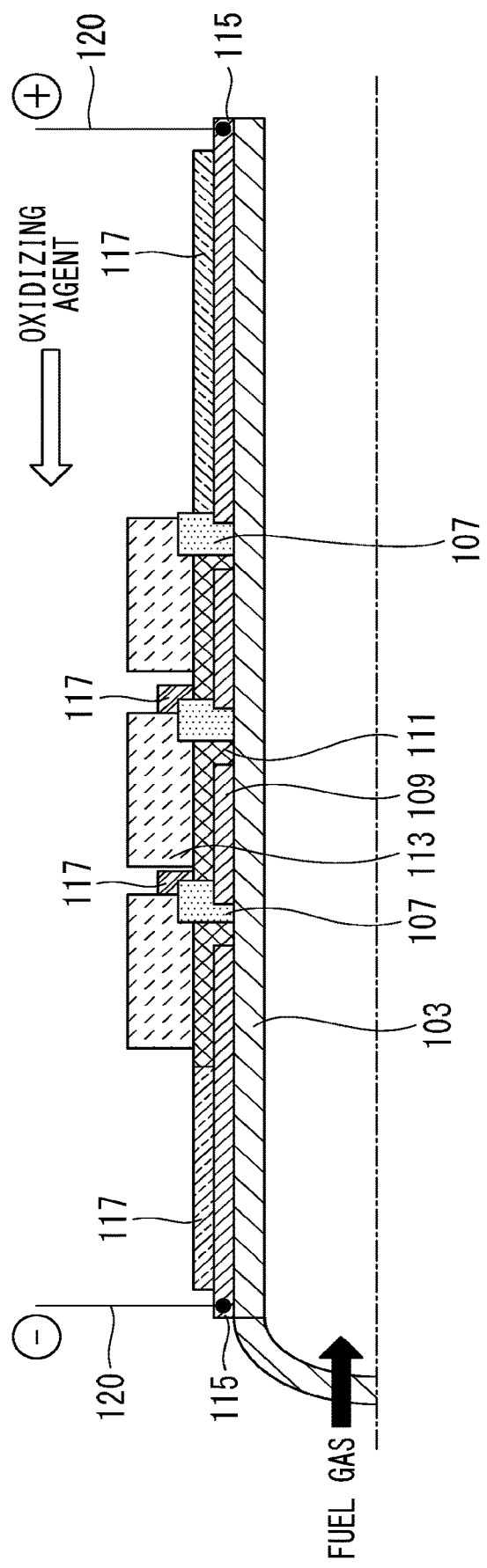
FIG. 2 is a diagram showing another aspect of the single fuel cell unit according to the first embodiment of the present disclosure.
Figure 3:
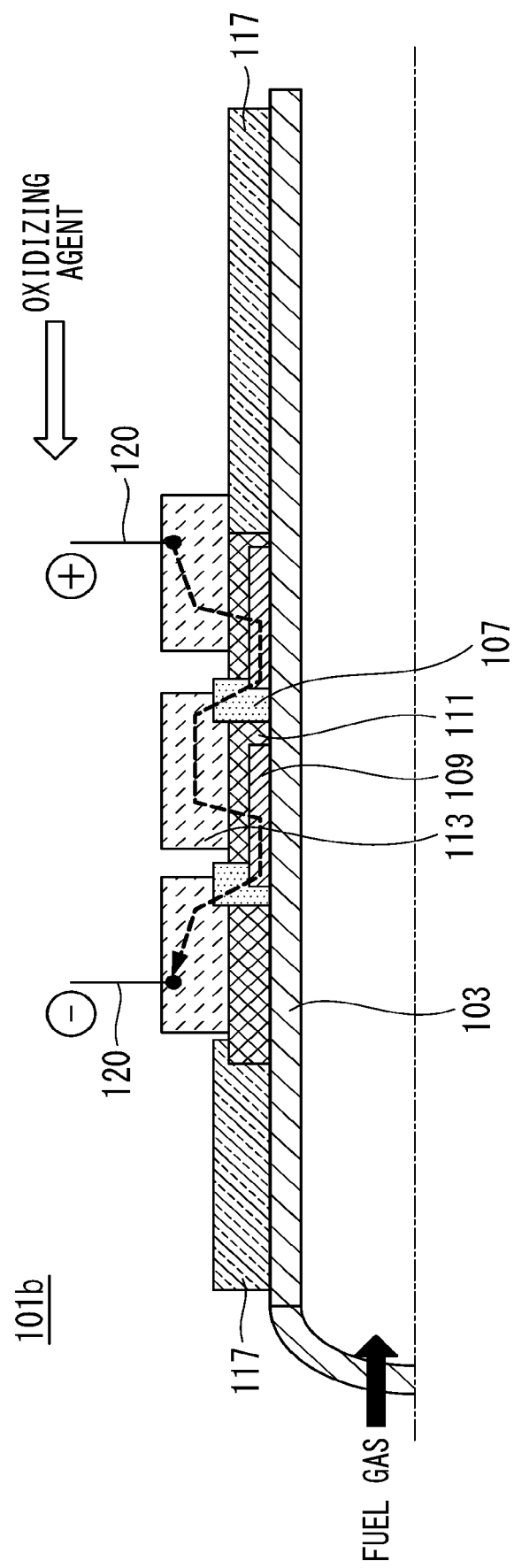
FIG. 3 is a diagram showing another aspect of the single fuel cell unit according to the first embodiment of the present disclosure.

FIGS. 2 and 3 illustrate another arrangement of the gas seal films 117. For example, as shown in the single fuel cell 101a of FIG. 2, between the cathodes 113, the gas seal films 117 may be provided on the interconnector 107 and/or the electrolyte 111 whose surface(s) are exposed because the cathodes 113 are not stacked thereon. For example, as shown in the single fuel cell 101b of FIG. 3, the lead film 115 may be omitted, and the gas seal films 117 may be provided just above the substrate tube 103. In that case, the current collecting member 120 is connected to the cathode 113.

The arrangement of the gas seal films 117 is not limited to that of FIGS. 1 to 3. The gas seal films 117 may be arranged so as to cover the surfaces of the power non-generation sections 110 that do not include the power generation sections 105 in which the three phases of the anode 109, the electrolyte 111, and the cathode 113 are stacked in the power generation sections 105 that need separation of the fuel gas and the oxidizing agent.

A side of the substrate tube 103 on which the cathode 113 is provided is set in an oxidizing agent atmosphere during power generation. An inside of the substrate tube 103 is set in a fuel gas atmosphere during power generation, and at the time of an emergency stop, the inside of the substrate tube 103 is purged with nitrogen after the fuel gas is shut off, so that the inside of the substrate tube 103 is set in a reducing atmosphere. The oxidizing agent is a gas containing about 15% to 30% of oxygen. Typically, air is preferable, but a mixed gas of a combustion exhaust gas and air, a mixed gas of oxygen and air or the like may also be used instead of air. Hydrogen ($H_2$) and not only hydrocarbon gas such as carbon monoxide (CO) or methane ($CH_4$), city gas, or natural gas, but also a gas manufactured by gasifying carbonaceous raw materials such as petroleum, methanol, or coal with gasifying facilities.

The substrate tube 103 is formed by firing a porous material. The porous material includes, as a main component, CaO stabilized $ZrO_2$ (CSZ), a mixture of CSZ and nickel oxide (NiO) (CSZ+NiO), $Y_2O_3$ stabilized $ZrO_2$ (YSZ), $MgAl_2O_4$ or the like, for example. The substrate tube 103 supports the power generation sections 105, the interconnectors 107, and the lead films 115, and causes the fuel gas supplied to the inner peripheral surface of the substrate tube 103 to diffuse to the anodes 109 formed on the outer peripheral surface of the substrate tube 103 through pores of the substrate tube 103.

The anodes 109 are formed by using, as a material, an oxide of a composite material of Ni and a zirconia-based electrolyte material and firing the material. For example, Ni/YSZ is used as the material of the anodes 109. The thickness of the anodes 109 is 50 to 250 µm, and the anodes 109 may be formed by screen-printing slurry of the material. In this case, Ni as a component of the anodes 109 has a catalytic action on the fuel gas. This catalytic action serves to react the fuel gas supplied through the substrate tube 103, for example, a mixed gas of methane ($CH_4$) and steam and reform the mixed gas into hydrogen ($H_2$) and carbon monoxide (CO). The anodes 109 serve to electrochemically react hydrogen ($H_2$) and carbon monoxide (CO) obtained by the reforming with oxygen ions ($O^{2-}$) supplied through the electrolyte 111 in the vicinity of the interface with the electrolyte 111 to generate water ($H_2O$) and carbon dioxide ($CO_2$). Note that at this time, the power generation sections 105 generate power by electrons emitted from oxygen ions.

The electrolyte 111 is formed by firing a material having airtightness which makes a gas difficult to permeate and having high oxygen ion conductivity at high temperature. YSZ is mainly used for the material. The electrolyte 111 serves to transfer oxygen ions ($O^{2-}$) generated at the cathode 113 to the anode 109. The film thickness of the electrolytes 111 located on the surfaces of the anodes 109 is 10 to 100 µm. The electrolytes 111 may be formed by screen-printing slurry of the material.

The cathodes 113 are formed by firing a material composed of, for example, $LaSrMnO_3$-based oxide or $LaCoO_3$-based oxide. The cathodes 113 may be formed by screen-printing slurry of the material or coating the slurry with a dispenser. The cathode 113 serves to dissociate oxygen in oxidant gas such as supplied air in the vicinity of the interface with the electrolyte 111 to generate oxygen ions ($O^{2-}$).

The cathode 113 may be formed to have a two-layer configuration. In this case, a cathode layer (cathode intermediate layer) on the electrolyte 111 side is formed of a material having high ionic conductivity and excellent catalytic activity. The cathode layer (cathode conductive layer) on the cathode intermediate layer may be made of a perovskite type oxide represented by Sr and Ca-doped $LaMnO_3$, which makes it possible to further enhance the power generation performance.

The interconnectors 107 are formed by firing a material composed of a conductive perovskite type oxide represented by $M_{(1-z)}LzTiO_3$ (M represents an alkaline earth metal element and L represents a lanthanoid element) such as $SrTiO_3$. The interconnectors 107 may be formed by screen-printing slurry of the material. The interconnector 107 forms a dense film so that the fuel gas and the oxidant gas do not mix. The interconnectors 107 have stable durability and electronic conductivity under both an oxidizing atmosphere and a reducing atmosphere. The interconnector 107 electrically connects the cathode 113 of one power generation section 105 of adjacent power generation sections 105 and the anode 109 of the other power generation section 105 of the adjacent power generation sections 105, thereby connecting the adjacent power generation sections 105 to each other in series.

It is necessary that the lead film 115 has electronic conductivity and has a coefficient of thermal expansion which is close to those of other materials constituting the single fuel cell 101. Therefore, the lead film 115 is formed of firing a composite material of Ni and a zirconia-based electrolyte material such as Ni/YSZ or a material composed of $M_{(1-z)}LzTiO_3$ (M represents an alkaline earth metal element and L represents a lanthanoid element) such as $SrTiO_3$. The lead film 115 serves to lead DC power generated by the plurality of power generation sections 105 connected in series through the interconnectors 107 to the vicinities of the end portions of the single fuel cell 101.

The gas seal film 117 forms a dense film so that the fuel gas and the oxidizing agent do not mix. The gas seal film 117 is formed by firing a material containing titanate $MTiO_3$ (M represents an alkaline earth metal element) doped with alkaline earth metal and metal oxide.

The thickness of the gas seal films 117 is 1 µm to 100 µm. The gas seal films 117 may be formed by screen-printing slurry of the above material. The gas seal film 117 is a film having insulating performance to oxygen ions.

The alkaline earth metal element is any one of Mg, Ca, Sr, and Ba. The alkaline earth metal element is preferably Sr or Ba. The metal oxide is $B_2O_3$, $Al_2O_3$, $Ga_2O_3$, $In_2O_3$, $Tl_2O_3$, $Fe_2O_3$, $Fe_3O_4$, MgO, NiO, $SiO_2$ or the like. The metal oxide is added in an amount of 3 mol % or more to $MTiO_3$. The metal oxide is added up to 100 mol % to $MTiO_3$.

The structure of the gas seal film 117 includes a first structure 11 and a second structure 12 which are different in composition. The first structure 11 includes M and Ti derived from $MTiO_3$ contained in the material as main components. The second structure 12 contains a metal element derived from the metal oxide contained in the material in a larger amount than the first structure 11. The area ratio of the second structure 12 to the structure of the gas seal film 117 is not less than 1% and not more than 50%. The gas seal film 117 of the present embodiment serves to prevent gas permeation in the power non-generation sections 110, and thus is not required to have electrical characteristics.

Since the gas seal film 117 whose second structure 12 has an area ratio of 1% or more has a low open porosity and thus is sufficiently dense, gas leakage can be prevented by providing the gas seal films 117 as described above in the power non-generation sections 110. However, when the area ratio of the second structure 12 is too high, a crack occurs in the gas seal film 117 due to a difference in thermal expansion between the support substrate 302 and the lower film, and gas permeation occurs. Therefore, it is desirable that the area ratio of the second structure 12 in the structure of the gas seal film 117 is set to not less than 1% and not more than 50%.

The single fuel cell 101 of FIG. 1 is manufactured by the following steps.

First, a material such as calcia stabilized zirconia (CSZ) is molded in the form of the substrate tube 103 by an extrusion molding method.

A material constituting the anodes 109 is mixed with an organic vehicle (an organic solvent added with a dispersant or a binder) or the like to prepare slurry for the anodes. The slurry for the anodes is coated onto the substrate tube 103 by using the screen-printing method. The slurry for the anodes is coated in the circumferential direction on the outer peripheral surface of the substrate tube 103 while divided into a plurality of sections corresponding to the number of elements of the power generation sections 105. The thickness of the slurry to be formed by coating is appropriately set so that the anodes 109 have a predetermined thickness after sintering described later.

A material constituting the lead films 115 is mixed with an organic vehicle or the like to prepare slurry for the lead films.

After the slurry for the anodes is coated, the slurry for the lead films is coated so as to cover the substrate tube 103 by using the screen-printing method. The thickness of the slurry to be formed by coating is appropriately set so that the lead films 115 have a predetermined thickness after sintering described later.

A material constituting the electrolytes 111 and a material constituting the interconnectors 107 are mixed with an organic vehicle or the like respectively to prepare slurry for the electrolytes and slurry for the interconnectors.

After the slurry for the lead films is coated, the slurry for the electrolytes and the slurry for the interconnectors are coated in this order at predetermined positions on the substrate tube 103. The slurry for the electrolytes is coated on the outer surfaces of the anodes 109 and on the substrate tube 103 between the adjacent anodes 109. The slurry for the interconnectors is coated in the circumferential direction on the outer peripheral surface of the substrate tube 103 at positions corresponding to gaps between the adjacent power generation sections 105. The thickness of the slurry to be formed by coating is appropriately set so that the electrolytes 111 and the interconnectors 107 have predetermined thicknesses after sintering described later.

A material constituting the gas seal films 117 is mixed with an organic vehicle or the like to prepare slurry for the gas seal films. For example, mixed powder obtained by mixing raw materials ($MTiO_3$ and metal oxide in FIG. 1) for 10 hours by a wet mixing method using a ball mill and then drying the mixed raw materials is used as the material constituting the gas seal films 117. Note that the area ratio of the second structure 12 may be arbitrarily adjusted according to the addition amount of the metal oxide to $MTiO_3$. After the slurry for the lead films is coated, the slurry for the gas seal films is coated on the slurry layers of the lead films. The thickness of the slurry to be formed by coating is appropriately set so that the gas seal films 117 have a predetermined thickness after sintering described later.

The substrate tube 103 coated with the aforementioned slurry is co-sintered in atmospheric air (in an oxidizing atmosphere). A sintering condition is specifically set to 1350° C. to 1450° C. and 3 to 5 hours.

By the co-sintering under the above condition, a gas seal film 117 including a first structure having a high content of $MTiO_3$ and a second structure having a high content of metal oxide is formed, and a film in which the area ratio of the second structure is not less than 1% and not more than 50% becomes a dense film. A sintering mechanism is as follows. Since $Al_2O_3$ undergoes liquid phase sintering, $Al_2O_3$ melts and spreads at a firing temperature, fills gaps of the $MTiO_3$, and partially becomes spinel-like $MAl_2O_4$ to form a second structure. A liquid-phase sintered portion has a larger content of $Al_2O_3$ (metal oxide) as compared with the first structure having a large content of $MTiO_3$, so that the composition of the metal oxide in the second structure is large.

Next, a material constituting the cathodes 113 is mixed with an organic vehicle or the like to prepare slurry for the cathodes. The slurry for the cathodes is coated onto the co-sintered substrate tube 103. The slurry for the cathodes is coated on the outer surfaces of the electrolytes 111 and at predetermined positions on the interconnectors 107. The thickness of the slurry to be formed by coating is appropriately set so that the cathodes 113 have a predetermined thickness after firing.

After the slurry for the cathodes is coated, the slurry is fired at 1100° C. to 1250° C. for 1 to 4 hours in atmospheric air (in an oxidizing atmosphere). The firing temperature of the slurry for the cathodes is set to be lower than the co-sintering temperature when the components from the substrate tube 103 to the gas seal films 117 are formed.

In the present embodiment, the surfaces of the lead films 115 on the side of the oxidant gas atmosphere are covered with the gas seal films 117 to prevent oxidation of Ni contained in the lead films 115, thereby causing an electrolyte type fuel battery to suffer less damage and have high reliability.

The gas seal films 117 formed by using $MTiO_3$ have low electronic conductivity. Such gas seal films 117 are suitable for preventing gas leakage in the power non-generation sections 110 which are portions where mixing of the fuel gas and the oxidizing agent is required to be prevented and insulating performance is required. The gas seal films 117 formed by using $MTiO_3$ can reduce short-circuit current to a negligible level.

Furthermore, since $MTiO_3$ has low oxygen ion conductivity, penetration of oxygen ions can be reduced to a negligible level.

Here, how low the oxygen ion conductivity of $MTiO_3$ is will be described by using $SrTiO_3$ as an example.

(Diffusivity of Oxygen Ion)

Figure 4:
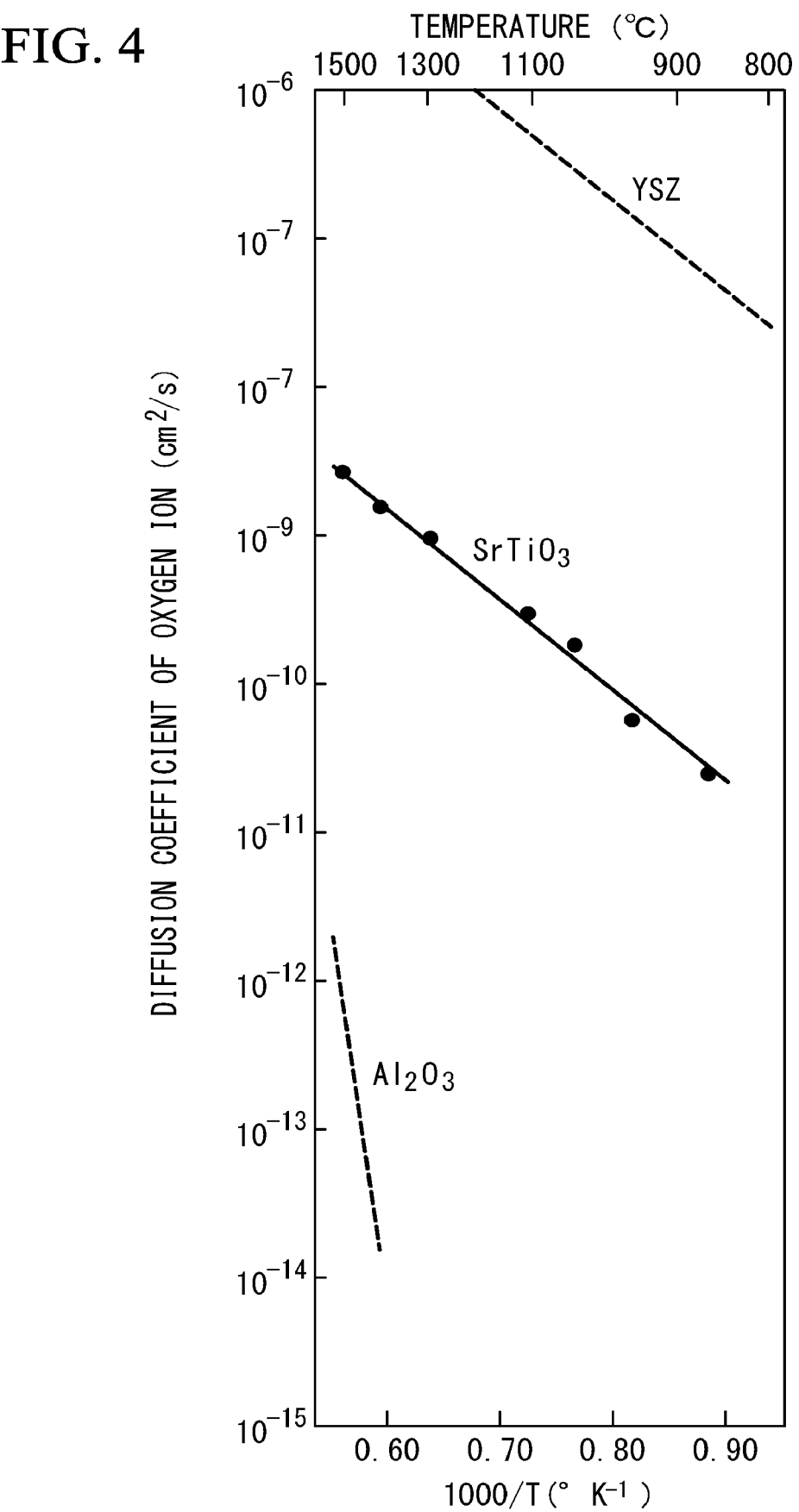
FIG. 4 is a diagram showing oxygen ion diffusion coefficients of YSZ, $SrTiO_3$, and $Al_2O_3$.

FIG. 4 shows diffusion coefficients of oxygen ions of $SrTiO_3$ (source of reference: "Journal of the American Ceramic Society", September 1965, p. 477, FIG. 3), yttria stabilized zirconia (source of reference: Reviews on advanced materials science, Vol 6, p. 7-11, 2004, P. 9, FIG. 1) and $Al_2O_3$ (source of reference: Hiroaki Tagawa, "Solid Oxide Fuel Cell and the Global Environment", Agne Shofusha, p. 97, FIG. 5.14). In FIG. 4, an upper horizontal axis represents temperature (° C.), a lower horizontal axis represents temperature ($1000/T$ (° $K^{-1}$)), and a vertical axis (logarithmic axis) represents an oxygen ion diffusion coefficient ($cm^2/s$).

According to FIG. 4, the diffusion coefficient of oxygen ions of yttria stabilized zirconia (YSZ) is on the order of $10^{-7}$ ($cm^2/sec$) at 900° C. According to FIG. 4, the diffusion coefficient of oxygen ions of $SrTiO_3$ in an oxidizing atmosphere is on the order of $10^{-10}$ ($cm^2/sec$) at 900° C. According to FIG. 4, the diffusion coefficient of oxygen ions of $Al_2O_3$ is not more than the order of $10^{-15}$ ($cm^2$/sec) at 900° C.

Therefore, it is considered that only at least about 1/1000 of oxygen ions of YSZ diffuse into the gas seal films 117 formed by firing a material containing $Al_2O_3$ and $SrTiO_3$.

Second Embodiment

This embodiment is different from the first embodiment in the material constituting the gas seal films. Configurations which are not particularly described are the same as those in the first embodiment.

In place of titanate $MTiO_3$ (M represents an alkaline earth metal element) doped with an alkaline earth metal, the gas seal films of the present embodiment include any one of titanate ($M_{(1+x)}TiO_3$: M represents an alkaline earth metal element, 0<x) which is excessively doped with an alkaline earth metal, and excessive titanate ($MTi_{(1+y)}O_3$: M represents an alkaline earth metal element, 0<y) which is doped with an alkaline earth metal. Furthermore, the gas seal films contain metal oxide.

The alkaline earth metal element is any one of Mg, Ca, Sr, and Ba. The alkaline earth metal element is preferably Sr or Ba. The upper limits of x and y may be set to about ¼ of the amount of metal oxide (mol %). The metal oxide is $B_2O_3$, $Al_2O_3$, $Ga_2O_3$, $In_2O_3$, $Tl_2O_3$, $Fe_2O_3$, $Fe_3O_4$, MgO, NiO, $SiO_2$ or the like. The metal oxide is added in an amount of 3 mol % or more to $MTiO_3$. The metal oxide may be added up to 100 mol % to $MTiO_3$.

The structure of the gas seal film includes a first structure and a second structure which are different in composition. The first structure includes, as main components, M and Ti derived from $M_{(1+x)}TiO_3$ or $MTi_{(1+y)}O_3$ contained in the material. The second structure contains a metal element derived from the metal oxide contained in the material in a larger amount than the first structure. The area ratio of the second structure in the structure of the gas seal film is not less than 1% and not more than 50%. The gas seal film of the present embodiment serves to prevent gas permeation in the power non-generation section 110.

Since the gas seal film including the second structure having the area ratio of 1% or more has a low open porosity and is sufficiently dense, gas leakage can be prevented by providing the gas seal film as described above in the power non-generation section 110. However, when the area ratio of the second structure is too high, a crack occurs in the gas seal film due to a difference in thermal expansion between a support substrate and an underlayer film, and gas permeation occurs. Therefore, it is desirable that the area ration of the second structure in the structure of the gas seal film is not less than 1% and not more than 50%.

Hereinafter, the structure of the gas seal film will be further described with reference to the drawings.
(Composition of Second Structure)

Figure 5:
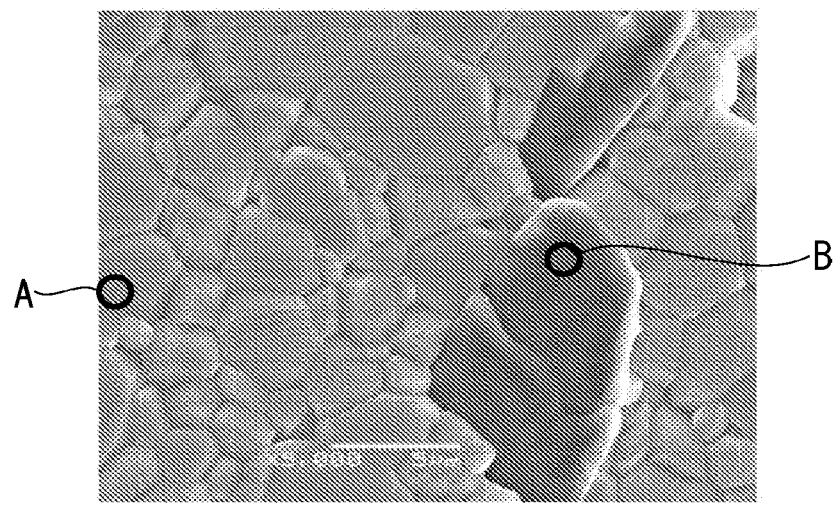
FIG. 5 is a scanning electron micrograph (×5,000) of a gas seal film (5 mol % added).
Figure 6:
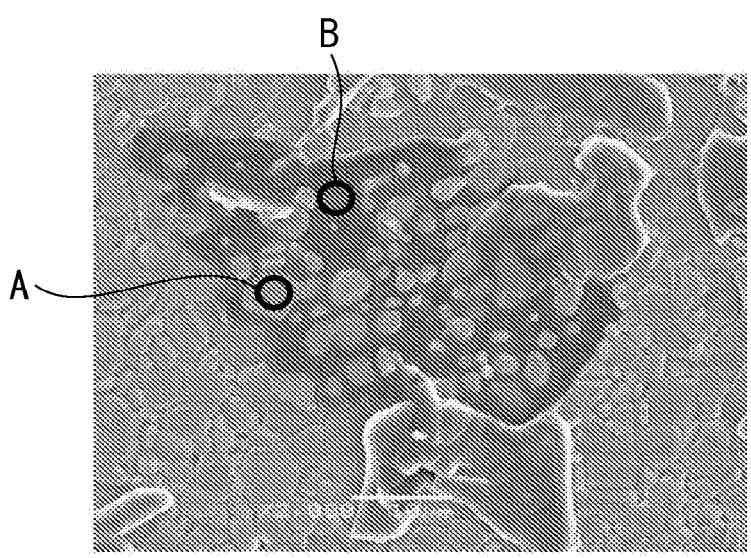
FIG. 6 is a scanning electron micrograph (×2,000) of the gas seal film (5 mol % added).

FIGS. 5 and 6 illustrate scanning electron micrographs of gas seal films obtained by firing, at 1400° C. for 4 hours, a material obtained by adding $Sr_{0.9}La_{0.1}TiO_3$ with 5 mol % of $Al_2O_3$ as metal oxide. According to FIGS. 5 and 6, it can be confirmed that each of the structures of the gas seal films includes a first structure (A) and a second structure (B).

Figure 7:
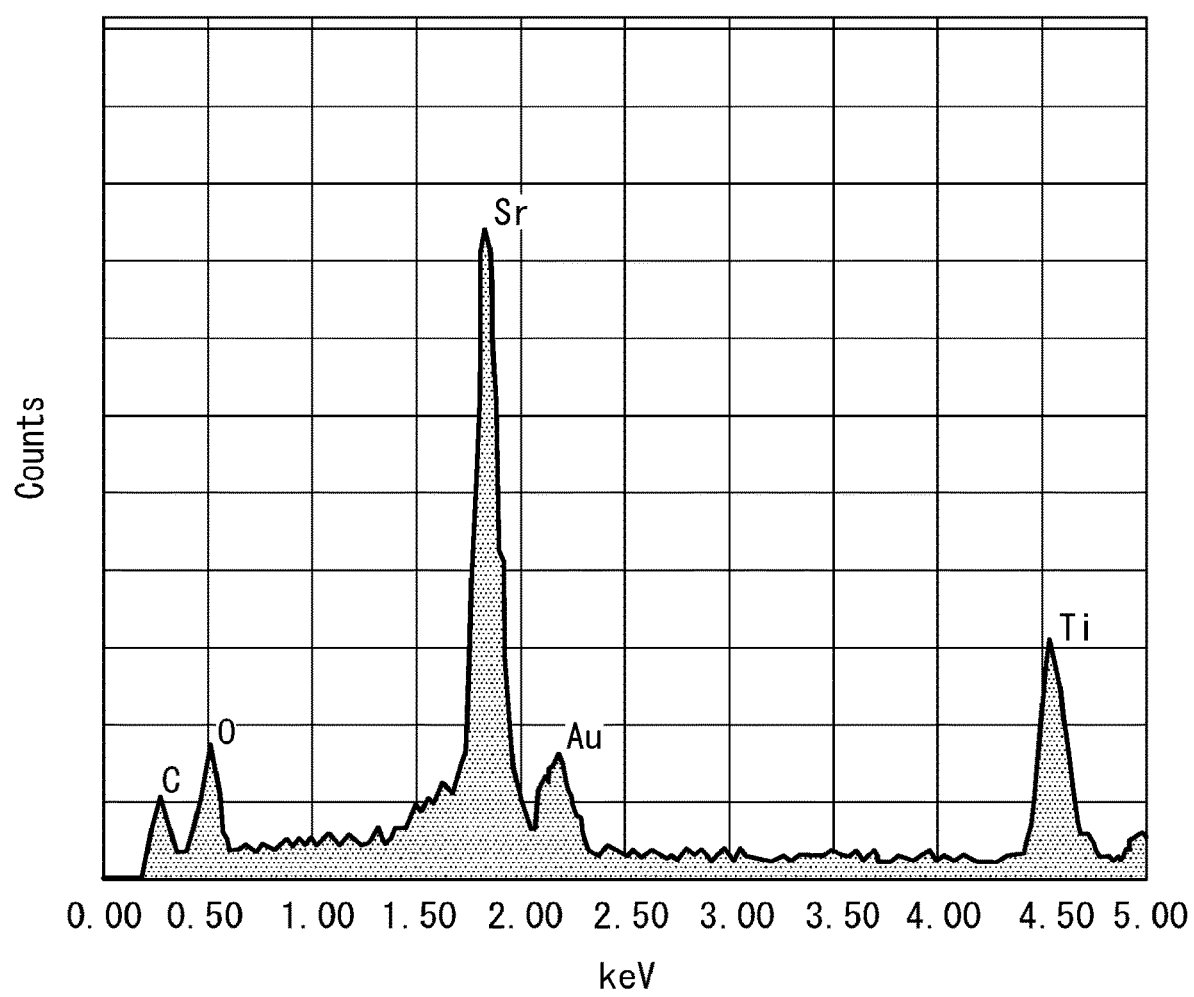
FIG. 7 is a diagram showing an EDS analysis result of the first structure in FIG. 5.
Figure 8:
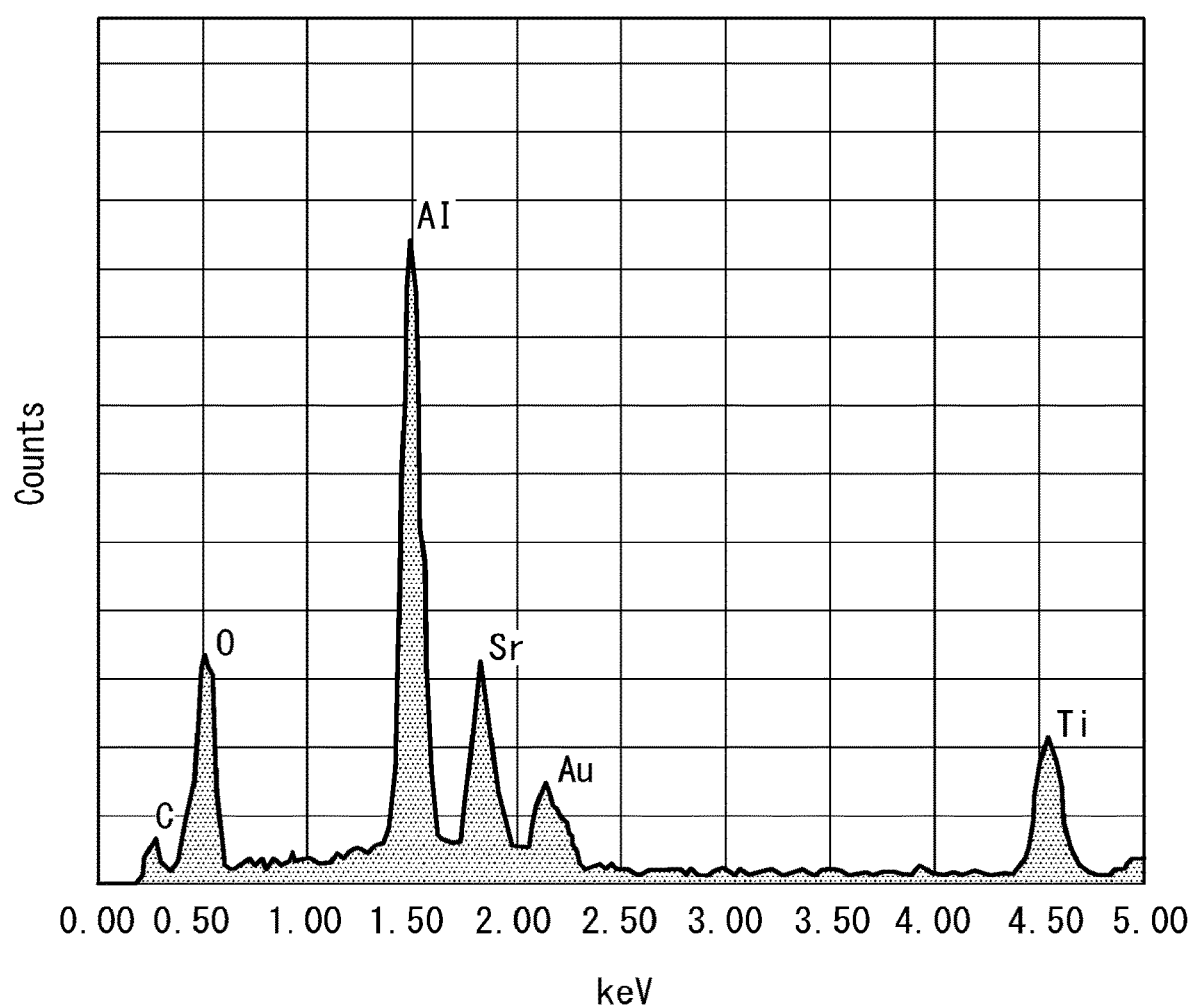
FIG. 8 is a diagram showing an EDS analysis result of the second structure in FIG. 5.
Figure 9:
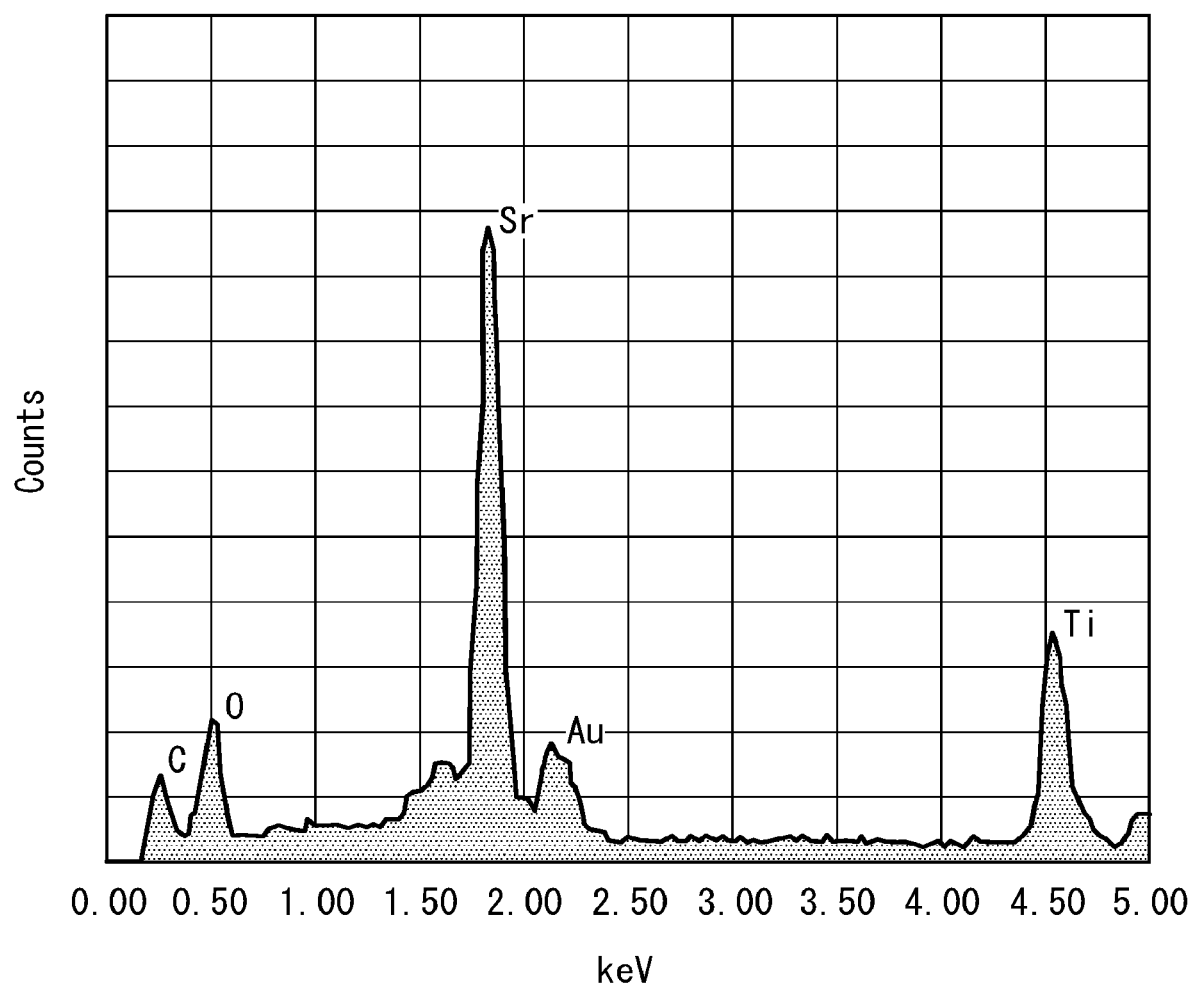
FIG. 9 is a diagram showing an EDS analysis result of the first structure in FIG. 6.
Figure 10:
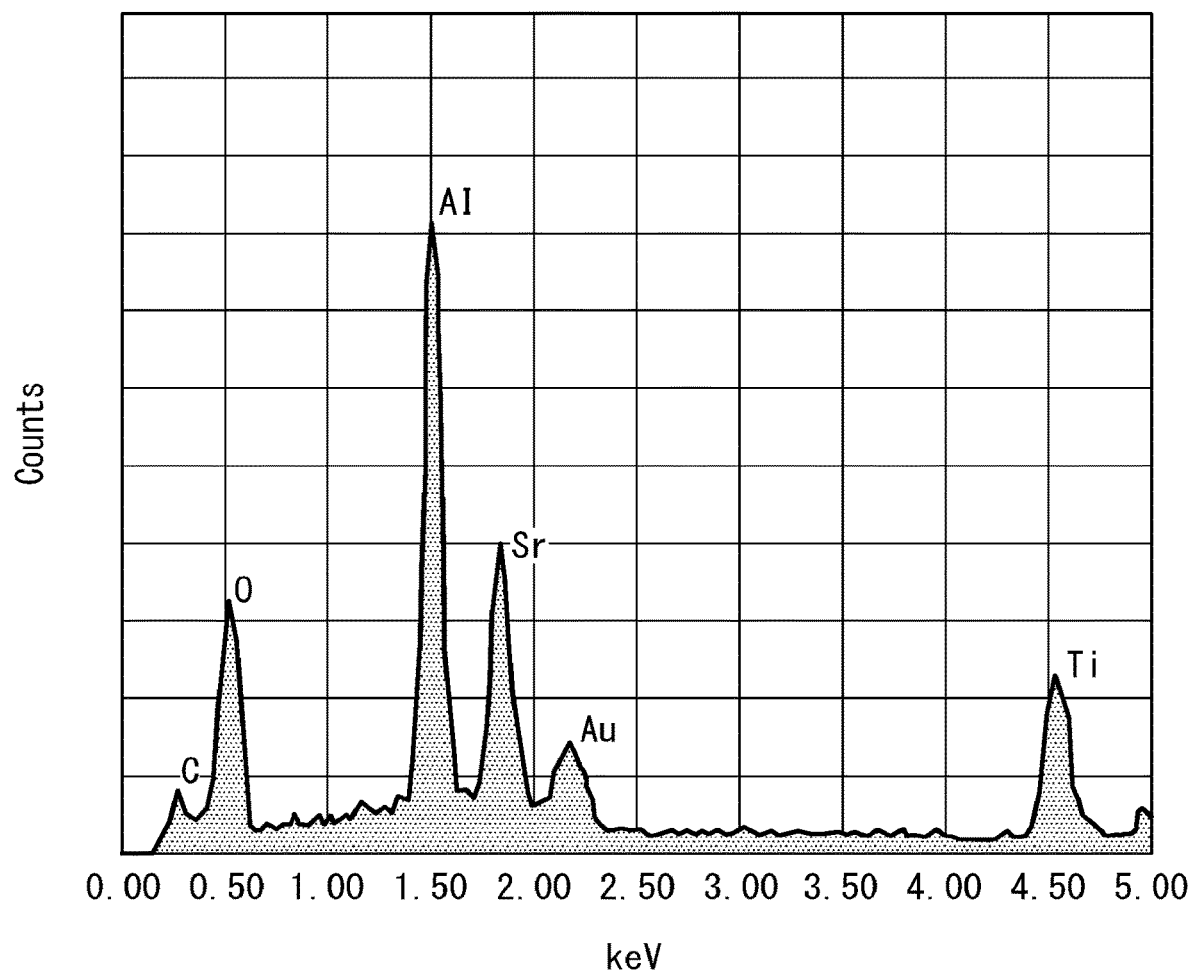
FIG. 10 is a diagram showing an EDS analysis result of the second structure in FIG. 6.

FIG. 7 shows an analysis result of an energy dispersive X-ray spectrometer (EDS) of the first structure (A) of FIG. 5. FIG. 8 shows an EDS analysis result of the second structure (B) of FIG. 5. FIG. 9 shows an EDS analysis result of the first structure (A) of FIG. 6. FIG. 10 shows an EDS analysis result of the second structure (B) of FIG. 6.

According to FIGS. 7 and 9, it was confirmed that the first structure (A) contained Sr and Ti as main components. According to FIGS. 8 and 10, it was confirmed that the second structure (B) contained Al as a main component, contained Sr and Ti, and had a composition different from that of the first structure (A). Comparing FIGS. 7 and 9 with FIGS. 8 and 10, the ratio of Sr and Ti taken into the second structure (B) was different from the ratio in the first structure (A).

From the foregoing results, by adding and firing metal oxide in a state where alkaline earth metal or $TiO_2$ is excessive, particles (second structure) which contain, as a main component, metal derived from the metal oxide are formed in the structure. The sintering character between the particles is enhanced by the influence of the particles, and the gas seal films which are dense and reduced in open porosity are formed. Such gas seal films can more reliably prevent gas leakage.
(Addition Amount of Metal Oxide)

A test piece of a gas seal film was prepared by using $Sr_{0.9}La_{0.1}TiO_3$(D10: 0.135 µm, D50: 0.472 µm, D90: 0.893 µm) and $Al_2O_3$(D10: 0.179 µm, D50: 0.289 µm, D90: 0.550 µm).

Figure 11:
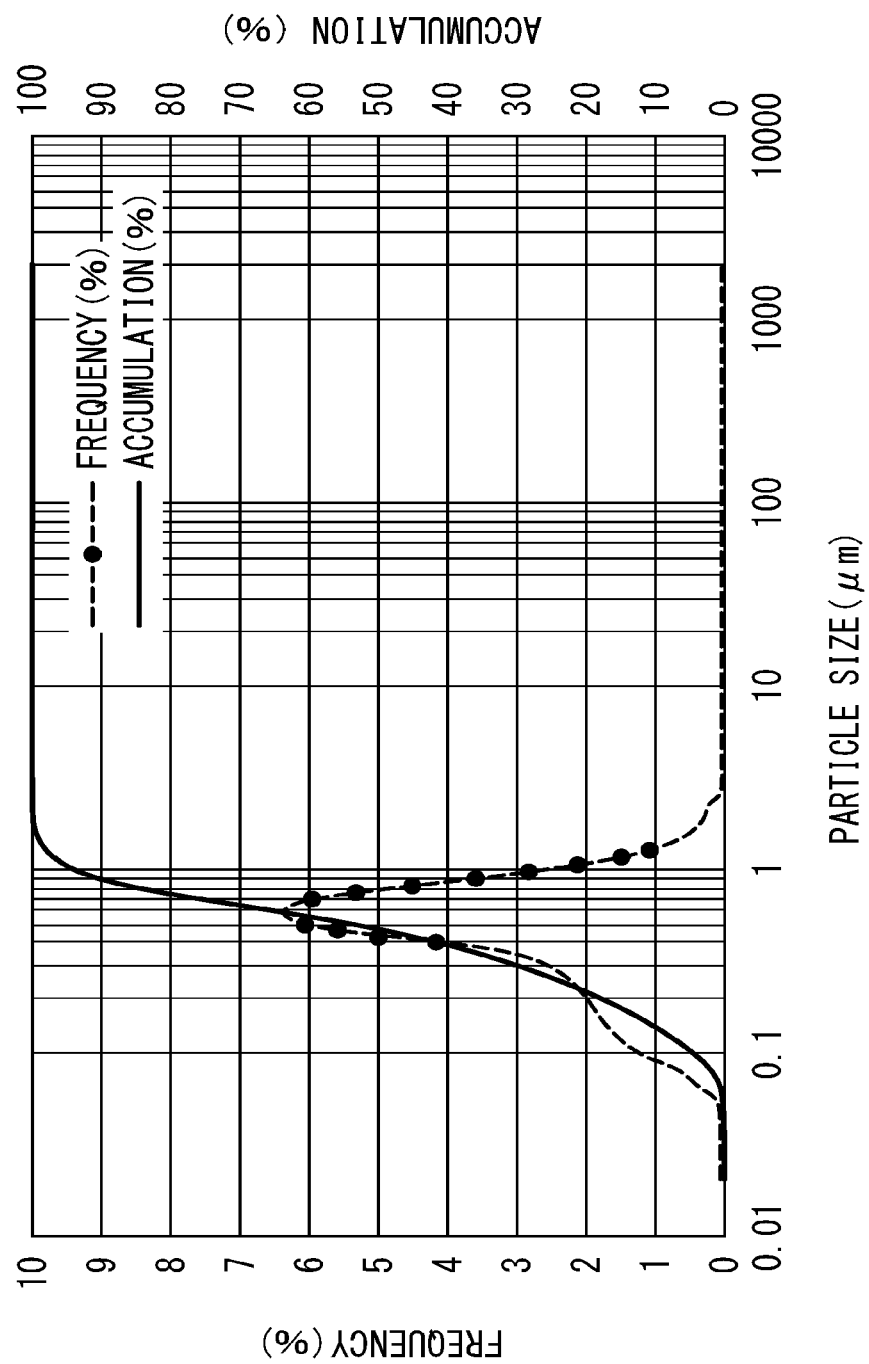
FIG. 11 is a particle size distribution diagram of titanate doped with Sr.
Figure 12:
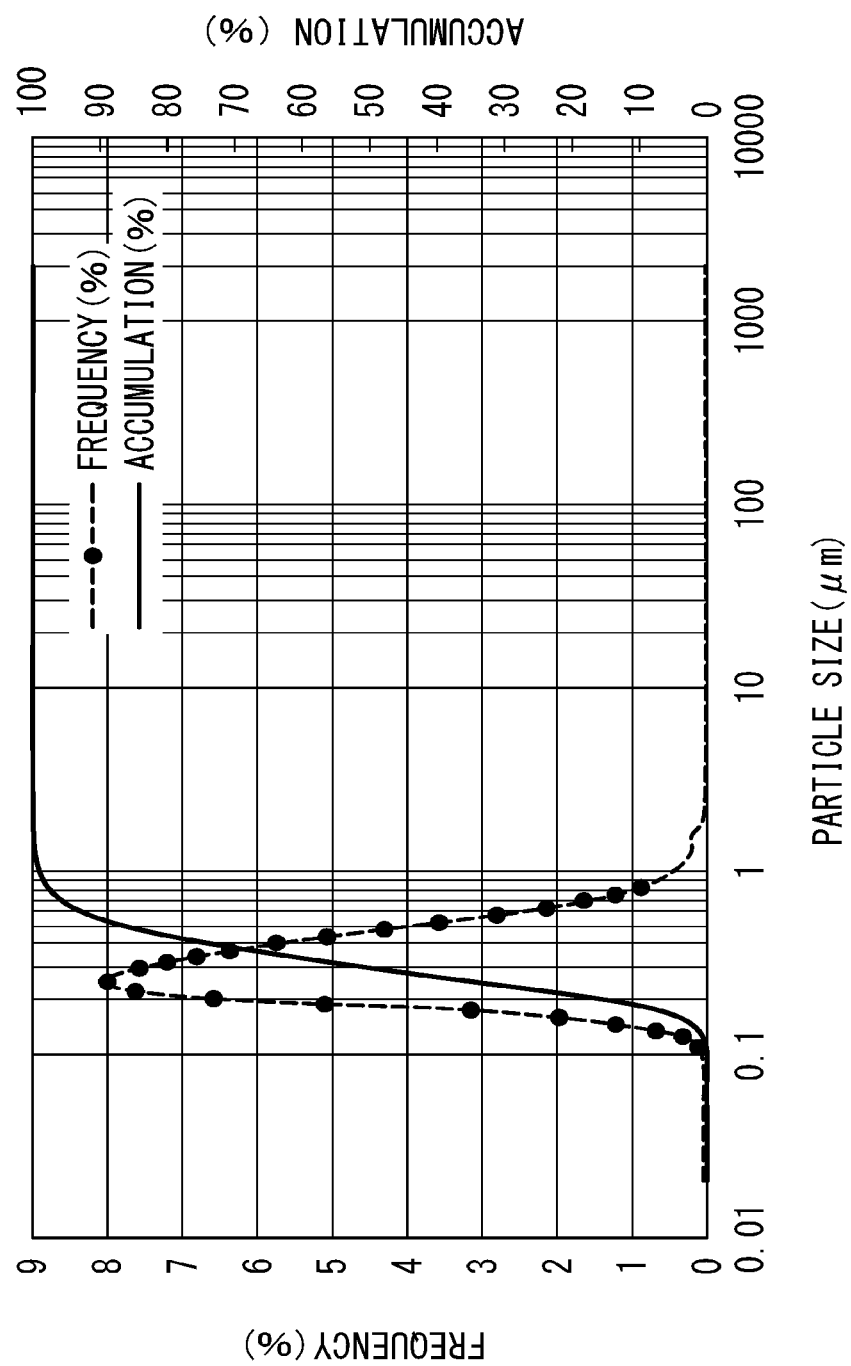
FIG. 12 is a particle size distribution diagram of $Al_2O_3$.

FIG. 11 shows a particle size distribution of $Sr_{0.9}La_{0.1}TiO_3$. In FIG. 11, a horizontal axis represents a particle size (µm), a left vertical axis represents a frequency (%), and a right vertical axis represents an accumulation (%). FIG. 12 shows a particle size distribution of $Al_2O_3$. In FIG. 12, a horizontal axis represents a particle size (µm), a left vertical axis represents a frequency (%), and a right vertical axis represents an accumulation (%).

FIGS. 13A to 13F show scanning electron micrographs (×1,000) of a gas seal film formed by preparing slurry from a material obtained by adding $Sr_{0.9}La_{0.1}TiO_3$ with $Al_2O_3$ as metal oxide and then molding and firing the slurry. The addition amounts of $Al_2O_3$ in FIGS. 13A to 13F are 0 mol %, 1 mol %, 3 mol %, 5 mol %, 7 mol %, and 9 mol % in this order. An observation cross-section of the gas seal film is set within a region in a vertical direction and a horizontal direction which occupies 50% to 80% of the thickness of the gas seal film in a partial region of the gas seal film which is far away from the underlayer film or the surface of the support substrate in the power non-generation section 110 by 3 µm or more. By setting the observation cross-section in this region, the first structure and the second structure can be measured without variation. Further, the first structure and the second structure have a color difference, and the ratio thereof can be calculated by performing binarization processing.

Figure 13A:
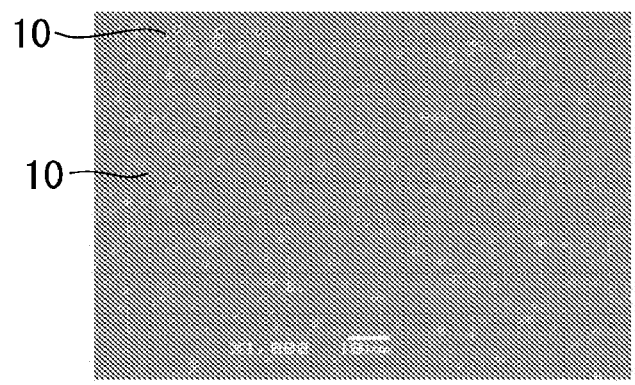
FIG. 13A is a scanning electron micrograph (×1,000) of a gas seal film (0 mol % added).
Figure 13B:
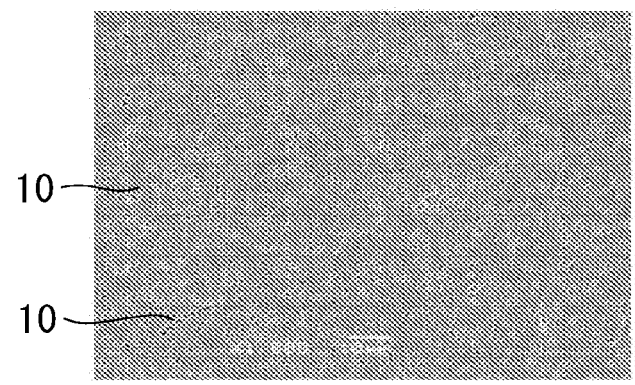
FIG. 13B is a scanning electron micrograph (×1,000) of a gas seal film (1 mol % added).
Figure 13C:
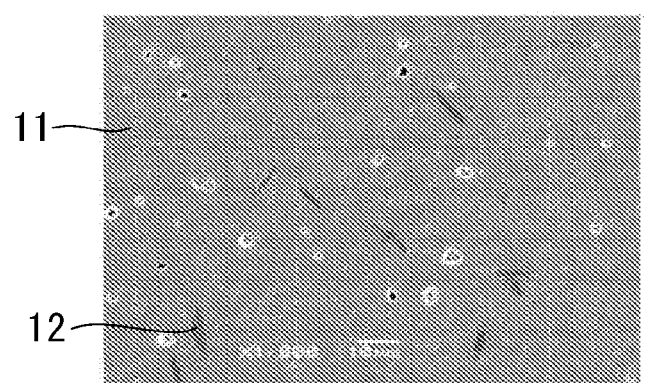
FIG. 13C is a scanning electron micrograph (×1,000) of a gas seal film (3 mol % added).
Figure 13D:
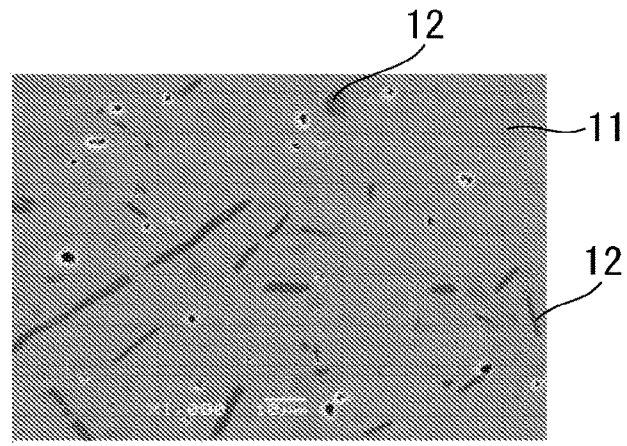
FIG. 13D is a scanning electron micrograph (×1,000) of a gas seal film (5 mol % added).
Figure 13E:
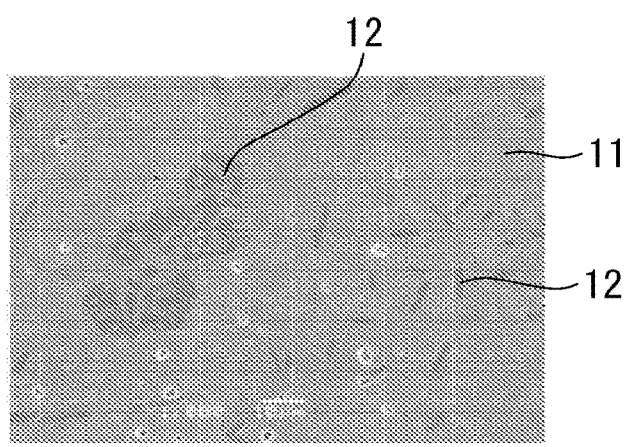
FIG. 13E is a scanning electron micrograph (×1,000) of a gas seal film (7 mol % added).
Figure 13F:
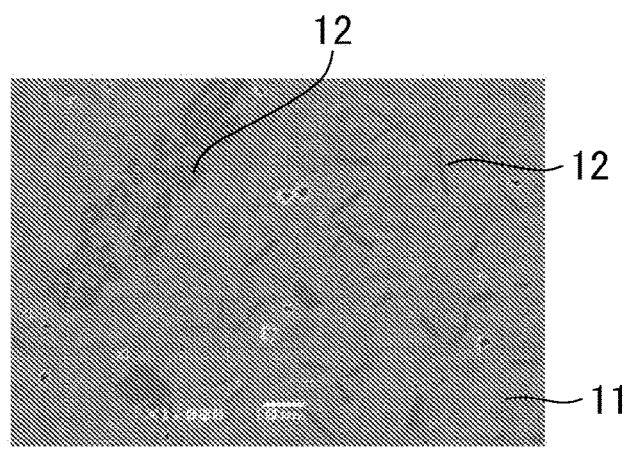
FIG. 13F is a scanning electron micrograph (×1,000) of a gas seal film (9 mol % added).

In FIGS. 13A and 13B, many pores 10 were observed. On the other hand, in FIGS. 13C to 13F, a first structure 11 growing greatly was observed. Furthermore, in FIGS. 13C to 13F, the pores 10 were hardly observed, and generation of a second structure 12 was newly confirmed. According to a result of image analysis of FIGS. 13C to 13F, the area ratio of the second structure 12 was 1% in FIG. 13C, 4% in FIG. 13D, 7% in FIG. 13E, and 9% in FIG. 13F.

Figure 14:
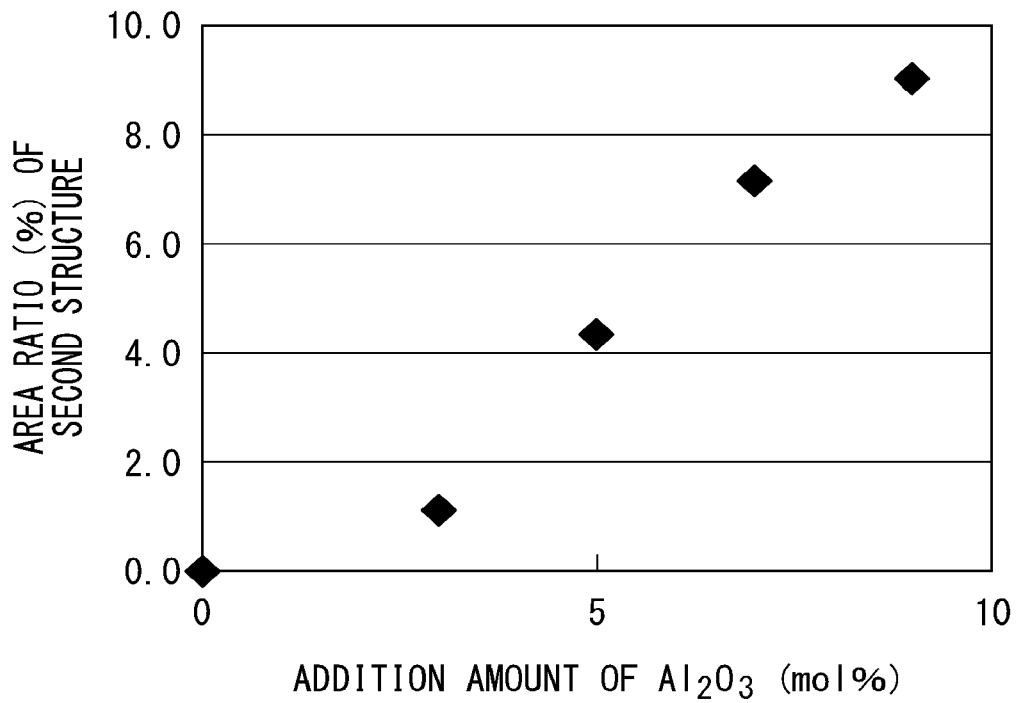
FIG. 14 is a diagram showing the relationship between an addition amount of $Al_2O_3$ and an area ratio of the second structure.

FIG. 14 shows the relationship between the addition amount of $Al_2O_3$ and the area ratio of the second structure 12 based on FIGS. 13A to 13F. In FIG. 14, a vertical axis represents the area ratio (%) of the second structure 12, and a horizontal axis represents the addition amount (mol %) of $Al_2O_3$. According to FIG. 14, it has been confirmed that the area ratio of the second structure 12 increases as the addition amount of $Al_2O_3$ increases.

Figure 15:
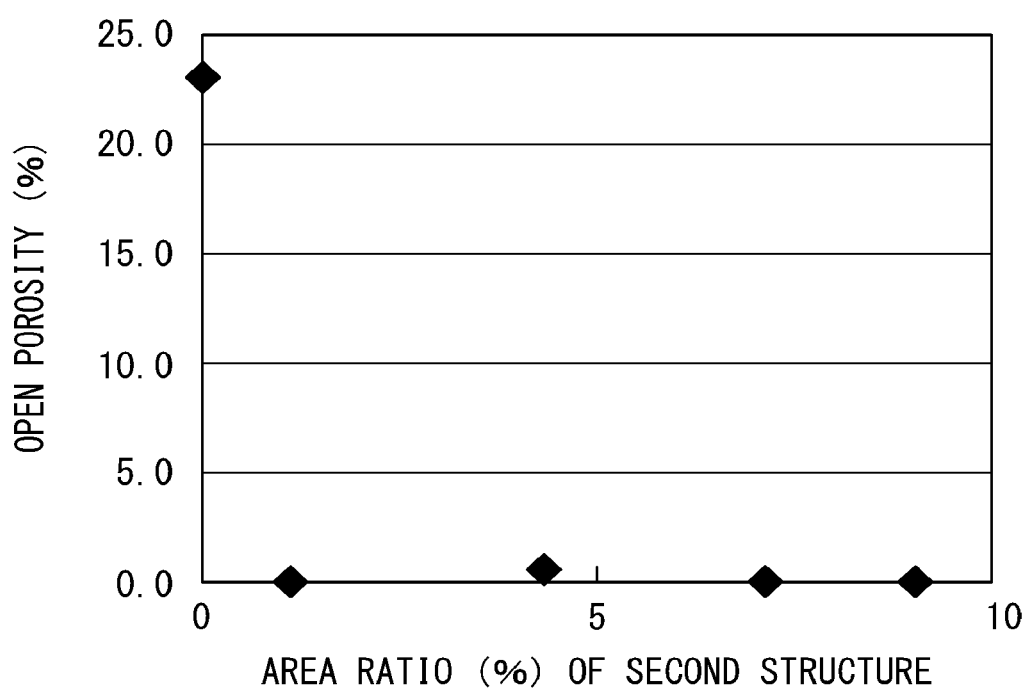
FIG. 15 is a diagram showing the relationship between an area ratio and an open porosity of the second structure.

FIG. 15 shows the relationship between the area ratio of the second structure 12 and the open porosity. In FIG. 15, a vertical axis represents the open porosity, and a horizontal axis represents the area ratio (%) of the second structure 12. The open porosity was obtained by measuring the test piece used in FIG. 15 by an Archimedes method based on JIS R 1634. According to FIG. 15, when the area ratio of the second structure 12 exceeded 1%, the open porosity was equal to substantially 0%. In this field, it is considered that gas leakage does not occur when the open porosity is 4% or less. Therefore, it was confirmed that if the area ratio of the second structure 12 was 1% or more, sufficient denseness to prevent gas permeation could be obtained.

Figure 16:
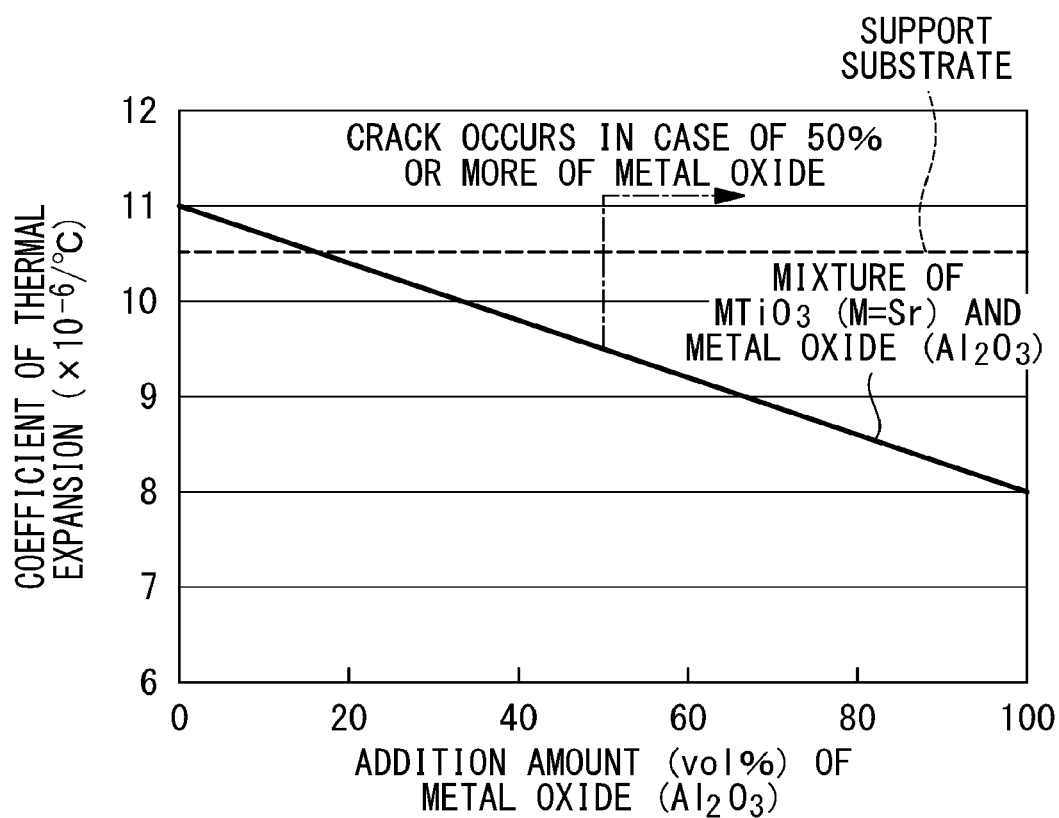
FIG. 16 is a diagram showing the relationship between an addition amount of metal oxide and a coefficient of thermal expansion.

FIG. 16 shows the relationship between the addition amount of metal oxide and the coefficient of thermal expansion. In FIG. 16, a vertical axis represents the coefficient of thermal expansion ($\times 10^{-6}/°$ C.), and a horizontal axis represents the addition amount (vol %) of metal oxide ($Al_2O_3$). FIG. 16 suggests that when the content of the metal oxide exceeds 50%, a crack may occur due to a difference in thermal expansion from the electrolyte material. According to this result, the area ratio of the second structure 12 is preferably not less than 1% and not more than 50%.

In the first embodiment and the second embodiment, a cylindrical horizontal stripe type is described as an example of the single fuel cell. However, the "gas seal film" using the material disclosed herein can be used for single fuel cells having various structures, for example, a single fuel cell such as a flat tubular in which the peripheral side surface of the cylinder is crushed vertically, and the shape and size are not particularly limited. Furthermore, with respect to the single fuel cell of the cylindrical horizontal stripe type described in the above embodiments, the single fuel cell is formed on the support substrate. However, the electrode (anode or cathode) may be formed to be thicker and also used as a substrate instead of the support substrate.

Further, the present invention can also be applied to a high-temperature steam electrolysis (SOSE) cell that produces hydrogen by applying power with the same configuration as the single fuel cell 101. In this case, the power generation section 105 in the first and second embodiments may be replaced with a hydrogen generation section for generating hydrogen without generating power, and the power non-generation section 110 may be replaced with a hydrogen non-generation section that does not generate hydrogen.

FIGS. 17A to 20 illustrate single fuel cells having various structures to which the gas seal film of the present disclosure can be applied.

Figure 17A:
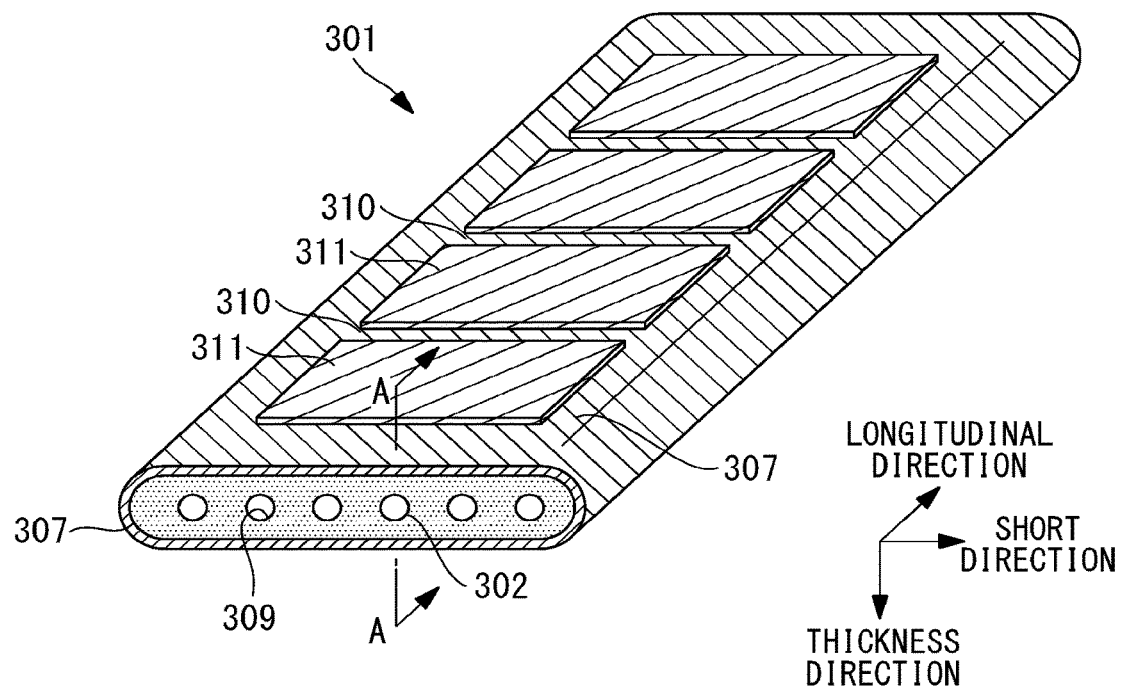
FIG. 17A is a perspective view of a single fuel cell which shows an example of a flat cylindrical multi-element cell structure.
Figure 17B:
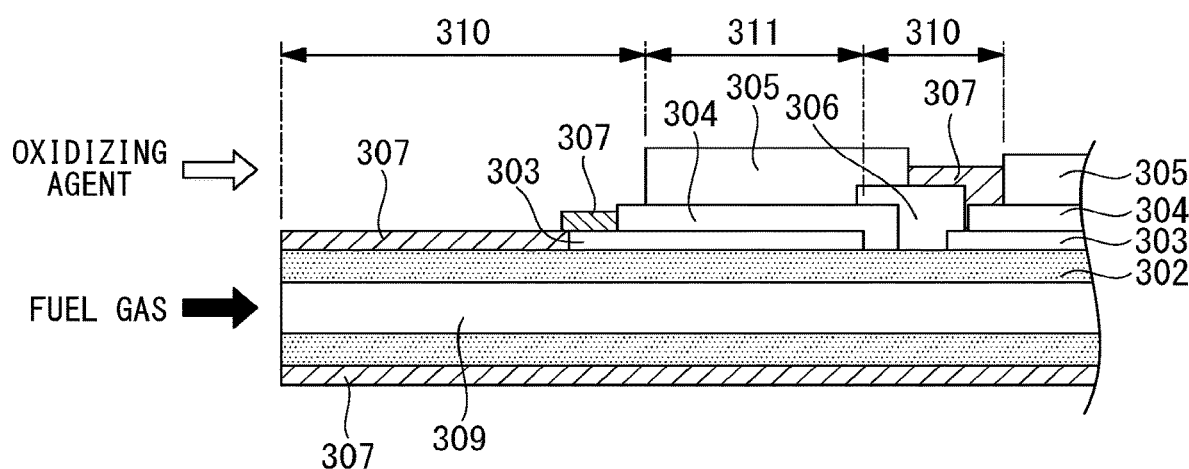
FIG. 17B is a cross-sectional view taken along A-A of FIG. 17A.

FIG. 17A is a perspective view of a single fuel cell 301 showing an example of the structure of a flat cylindrical multi-element cell. FIG. 17B is a cross-sectional view taken along A-A of FIG. 17A.

The single fuel cell 301 in FIG. 17A has a porous support substrate 302 having a cylindrical tubular shape in cross-section and having an elliptical column shape on the whole. A plurality of fuel gas flow paths 309 are formed at appropriate intervals inside the support substrate 302. The single fuel cell 301 has a structure in which various members are provided on the support substrate 302. Anodes 303 are provided on one surface of a flat portion of the support substrate 302, and electrolytes 304 are further stacked so as to cover the anodes 303. Cathodes 305 are stacked on the electrolytes 304 so as to face the anodes 303 to form power generation sections 311. Furthermore, end portions of the cathodes 305 and end portions of the anodes 303 of adjacent power generation sections 311 are connected to one another by interconnectors 306, thereby establishing a multi-element configuration. By forming the gas seal films 307 on the upper surfaces and side surfaces of the power non-generation sections 310 where the electrolytes 304 are not stacked, it is possible to prevent the fuel gas from leaking to portions other than the power generation sections 311. Further, by forming the gas seal films 307 on the cathode 305 sides of the power non-generation sections 310 sandwiched between the power generation sections 311, it is possible to more reliably prevent the penetration of oxygen from the power non-generation sections 310.

Figure 18A:
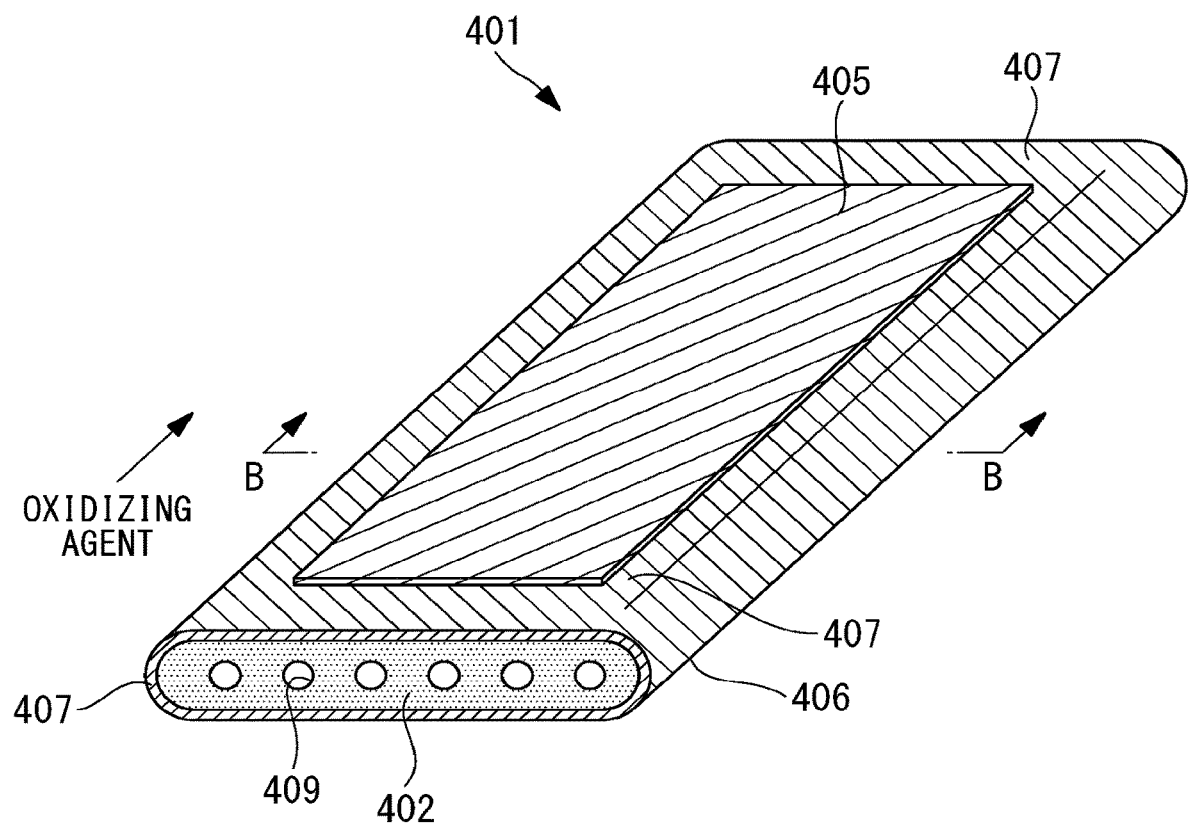
FIG. 18A is a diagram of a single fuel cell which shows an example of a flat cylindrical single cell structure.
Figure 18B:
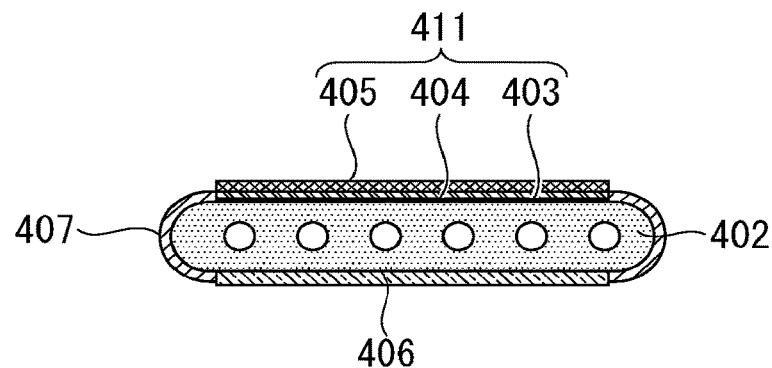
FIG. 18B is a cross-sectional view taken along B-B of FIG. 18A.

FIG. 18A is a perspective view of a single fuel cell 401 showing an example of the structure of a flat cylindrical single cell. FIG. 18B is a cross-sectional view taken along B-B of FIG. 18A.

The single fuel cell 401 in FIG. 18A includes a porous conductive support substrate 402 having a cylindrical tubular shape in cross-section and having an elliptical column shape on the whole. A plurality of fuel gas flow paths 409 are formed at appropriate intervals inside the conductive support substrate 402. The single fuel cell 401 has a structure in which various members are provided on the conductive support substrate 402.

An anode 403 is provided on one surface of a flat portion of the conductive support substrate 402, and an electrolyte 404 is further stacked so as to cover the anode 403. A cathode 405 is stacked on the electrolyte 404 to form a power generation section 411. An interconnector 406 is provided on a surface of the conductive support substrate 402 which faces the anode 403. The voltage is increased by electrically connecting the cathode 405 and the interconnector 406 of adjacent single fuel cells 401 in series. By forming a gas seal film 407 on the upper surface of the power non-generation section where neither the electrolyte 404 nor the interconnector 406 is stacked and on the side surface of the conductive support substrate 402, it is possible to prevent the fuel gas from leaking to portions other than the power generation section.

Figure 19:
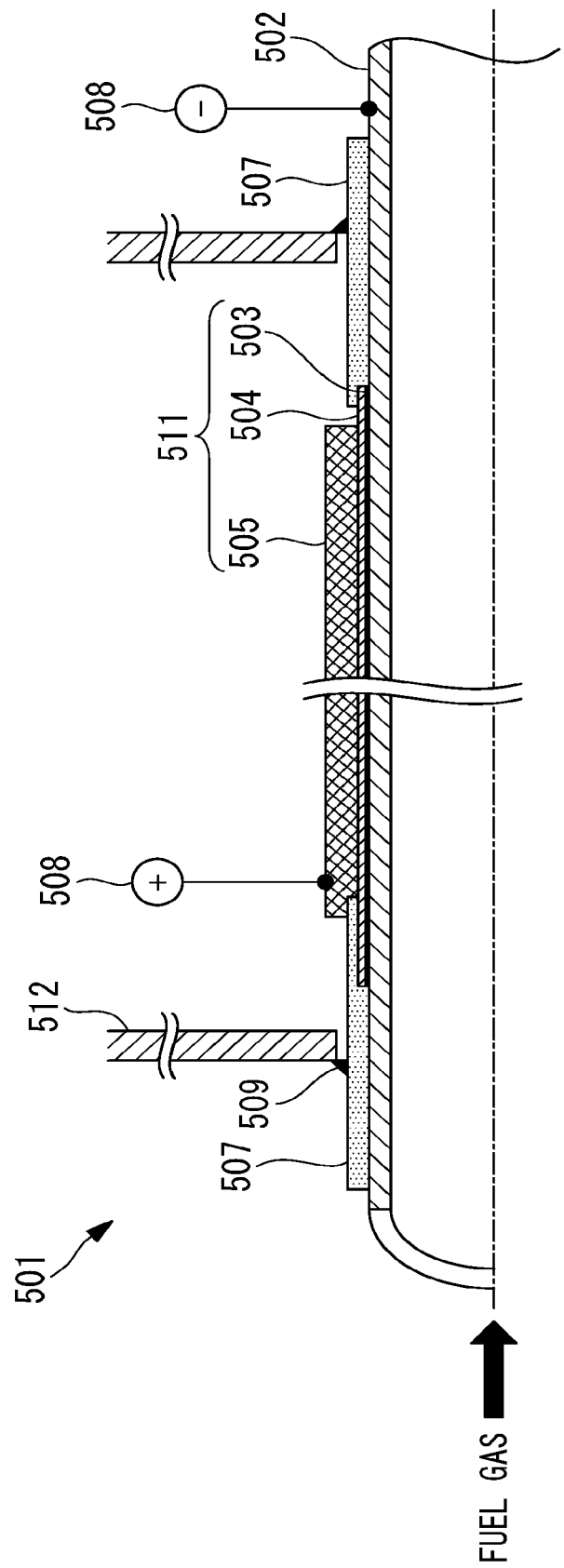
FIG. 19 is a diagram of a single fuel cell which shows an example of a cylindrical single cell structure.

FIG. 19 is a single fuel cell diagram showing one example of the structure of a cylindrical single cell.

A single fuel cell 501 of FIG. 19 has a structure in which various members are provided on the outer surface of a porous conductive substrate tube 502.

An anode 503 is provided on the surface of the conductive substrate tube 502, and an electrolyte 504 is further stacked so as to cover the anode 503. A cathode 505 is stacked on the electrolyte 504 to form a power generation section 511. Gas seal films 507 are formed on both ends of the electrolyte 504 so as to partially overlap both the ends, and a current collecting member 508 is provided on the cathode 505 on one side and the conductive substrate tube 502 on the other side in a longitudinal direction.

Figure 20:
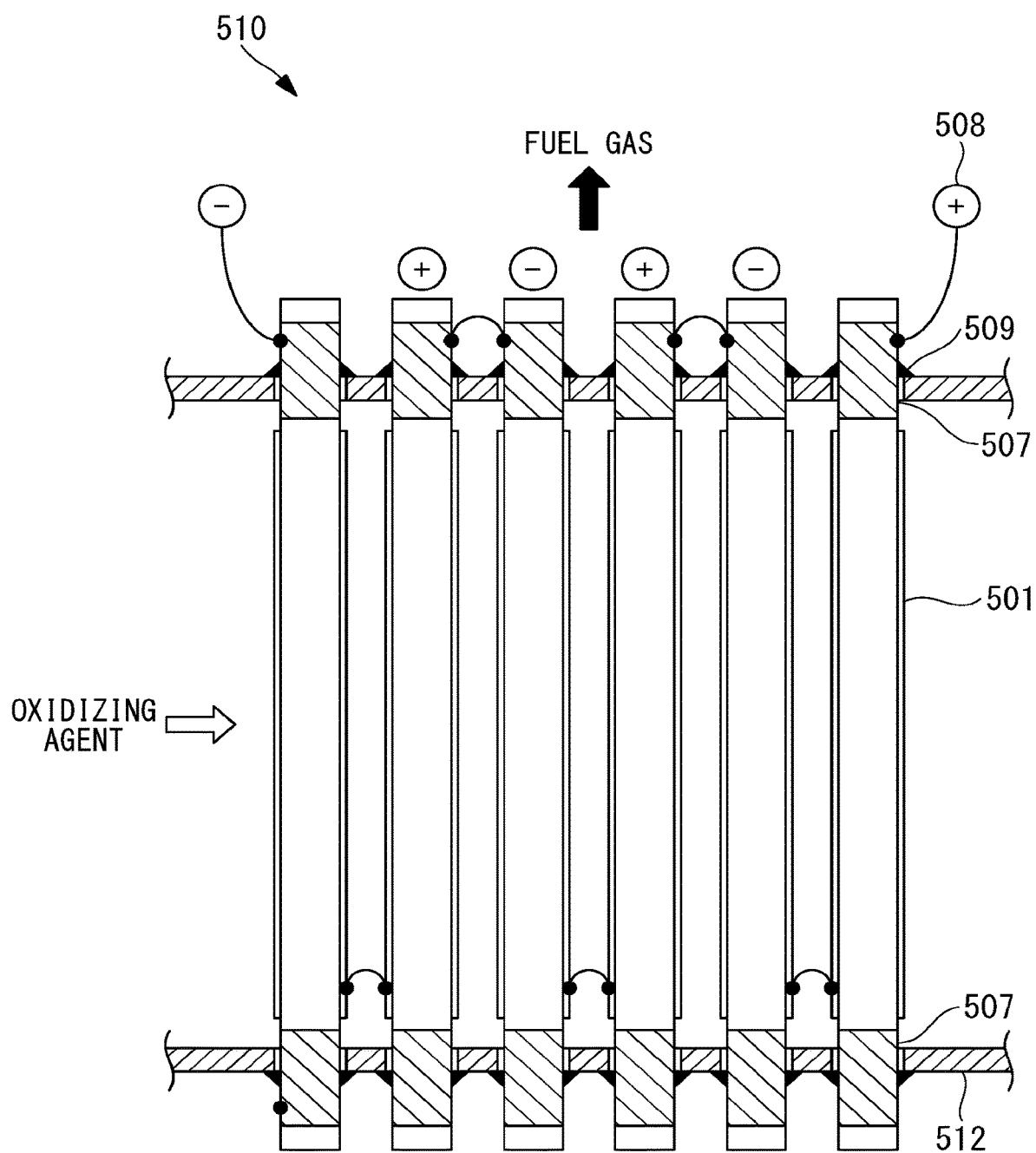
FIG. 20 is a diagram of a single fuel cell module which shows an example of a cylindrical single cell module structure.

FIG. 20 is a diagram showing an example of the structure of a fuel cell module adopting the single fuel cell 501. In the fuel cell module 510, the flow paths of the fuel gas and the oxidizing agent of the single fuel cells 501 are insulated from each other by a seal tube plate 512, and gas sealing between the seal tube plate 512 and the single fuel cell 501 is performed by seal members 509 formed on both ends of the single fuel cells 501. The polarities of the adjacent single fuel cells 501 are switched upside down and connected by a current collecting member 508 to increase the voltage. The gas seal films 507 are formed on both ends of the conductive substrate tube 502, which makes it possible to prevent oxidation of the conductive substrate tube 502.

The single fuel cells 301 and 401 (flat cylindrical cells (multi-element and single-element)) and the single fuel cell 501 (cylindrical single cell) described above are the support structure type single fuel cells 301, 401 and 501 using the porous substrate tube 502 or the support substrates 302 and 402. However, the support structure is not limited to the above type. The type of the support structure may be an electrolyte support type, an anode support type, a cathode support type, a metal support type, an insulating support type or the like. In the metal support type, the single fuel cells 301, 401, and 501 are supported by metal made of heat-resistant alloy such as stainless steel or Hastelloy. In the insulating support type, the single fuel cells 301, 401, and 501 are supported by a ceramic insulating material such as zirconia or alumina.

Figure 21:
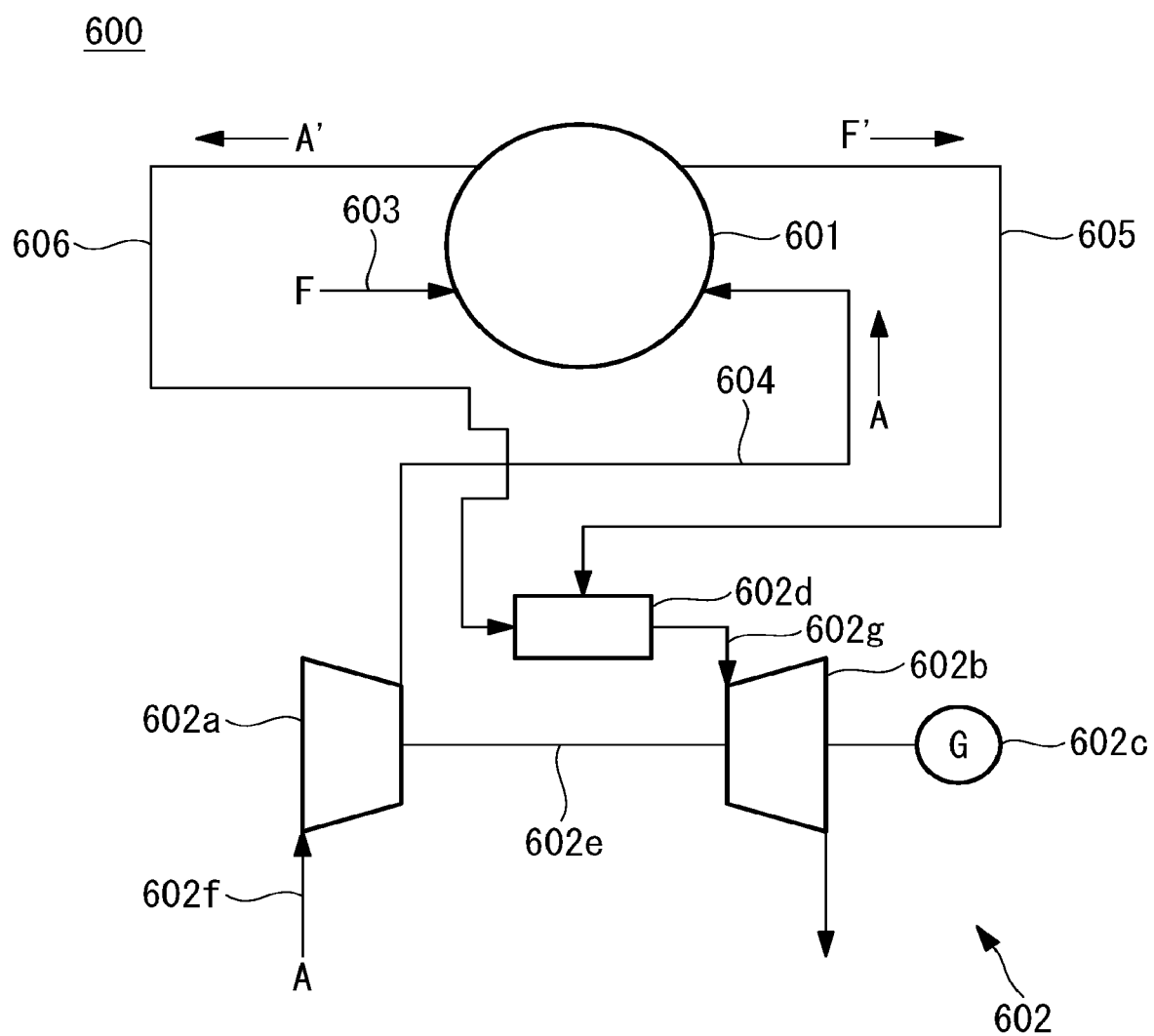
FIG. 21 is a schematic configuration diagram showing an example of a power generation system.
Figure 22:
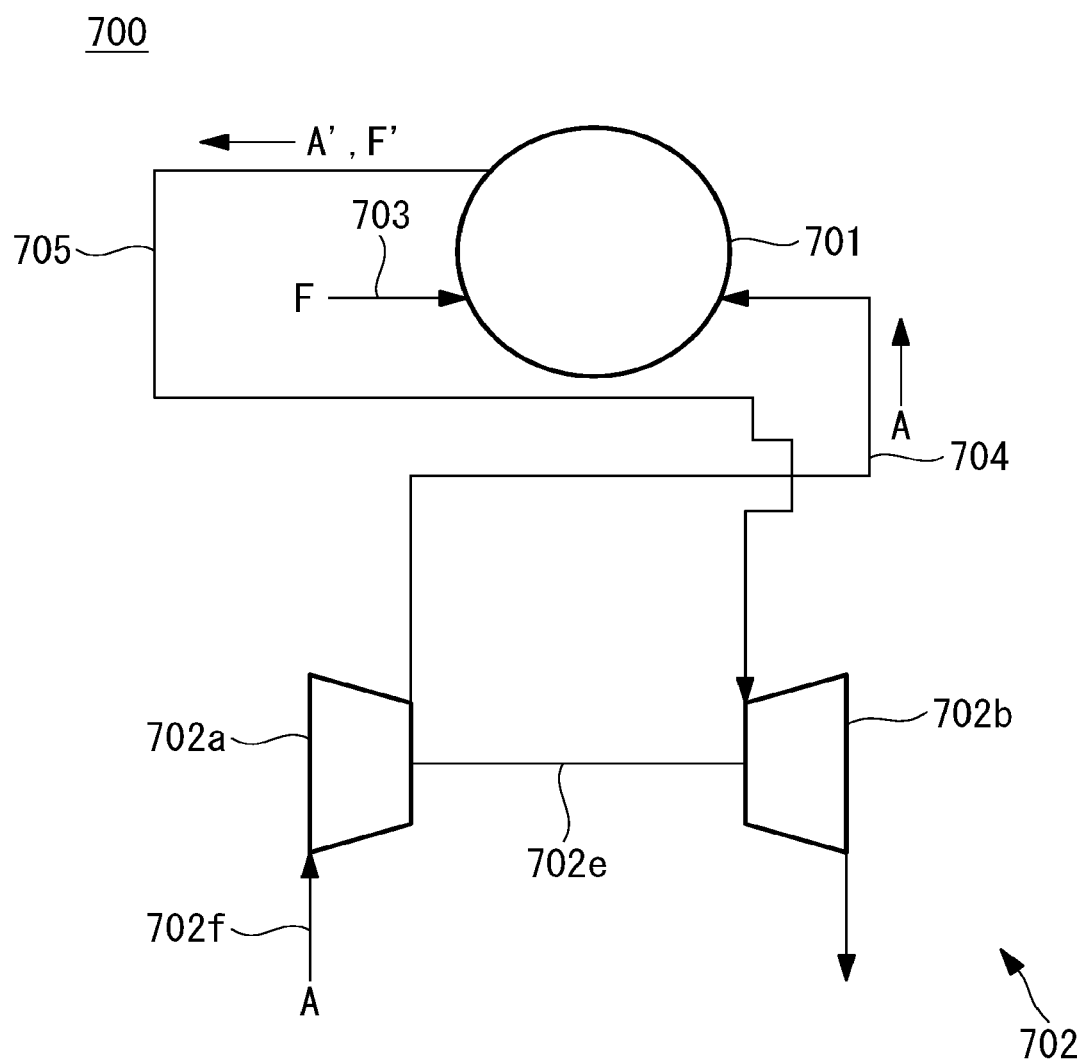
FIG. 22 is a schematic configuration diagram showing an example of a power generation system.

Next, power generation systems 600 and 700 including any one of the single fuel cells 101, 301, 401, and 501 described in the first embodiment, the second embodiment, or FIGS. 17A to 20 will be described. FIGS. 21 and 22 show examples of schematic configuration diagrams of the power generation systems 600 and 700.

The power generation system 600 of FIG. 21 includes a fuel cell module 601 and rotating equipment 602 that generates rotational power by using exhaust fuel gas and exhaust oxidant gas exhausted from the fuel cell module 601.

The fuel cell module 601 includes a plurality of single fuel cells each including an anode (fuel-side electrode), an electrolyte, and a cathode (oxygen-side electrode). The fuel cell module 601 includes a fuel gas supply pipe 603 for supplying a fuel gas (F) to each anode, an oxidant gas supply pipe 604 for supplying an oxidant gas (A) to each cathode, a fuel gas exhaust pipe 605 through which the fuel gas supplied to each anode is exhausted, and an oxidant gas exhaust pipe 606 through which the oxidant gas supplied to each cathode is exhausted.

In FIG. 21, the rotating equipment is configured by a gas turbine 602. The gas turbine 602 includes a compressor 602a, a turbine 602b, an electric generator 602c, and a combustor 602d.

The compressor 602a is connected to the fuel cell module 601 via the oxidant gas supply pipe 604. The compressor 602a and the turbine 602b are integrally rotatably connected to each other by a rotation shaft 602e. The compressor 602a compresses oxidant gas (A) taken in from an oxidant gas intake line 602f by using rotation of the turbine 602b as power. The compressed oxidant gas (A) is supplied to each anode side of the fuel cell module 601 through the oxidant gas supply pipe 604.

The combustor 602d is connected to the fuel cell module 601 via the fuel gas exhaust pipe 605 and the oxidant gas exhaust pipe 606. The combustor 602d mixes and combusts the exhaust fuel gas (A') and the exhaust oxidant gas (F') which have been exhausted from the fuel cell module 601. Gas (combustion gas) generated by the combustion is supplied to the turbine 602b through a combustion gas supply line 602g.

Supply of the combustion gas to the turbine 602b causes the turbine 602b to rotate. The electric generator 602c is provided coaxially with the turbine 602b, and can generate power upon rotation of the turbine 602b.

The fuel cell module 601 can generate power by using the fuel gas (F) supplied through the fuel gas supply pipe 603 and the compressed oxidant gas (A) supplied through the oxidant gas supply pipe 604.

The power generation system 700 of FIG. 22 includes a fuel cell module 701 and rotating equipment 702 that generates rotational power by using exhaust fuel gas and exhaust oxidant gas which are exhausted from the fuel cell module 701.

The fuel cell module 701 includes a plurality of single fuel cells each having an anode (fuel-side electrode), an electrolyte, and a cathode (oxygen-side electrode). The fuel cell module 701 includes a fuel gas supply pipe 703 for supplying a fuel gas (F) to each anode, an oxidant gas supply pipe 704 for supplying an oxidant gas (A) to each cathode, and an exhaust pipe 705 through which the supplied fuel gas and the oxidant gas supplied to each cathode are exhausted.

In FIG. 22, the rotating equipment is configured by a turbocharger 702. The turbocharger 702 includes a compressor 702a and a turbine 702b.

The compressor 702a is connected to the fuel cell module 701 via the oxidant gas supply pipe 704. The compressor 702a and the turbine 702b are integrally rotatably connected to each other by a rotating shaft 702e. The compressor 702a compresses oxidant gas (A) taken in from an oxidant gas intake line 702f by using rotation of the turbine 702b as power. The compressed oxidant gas (A) is supplied to each anode side of the fuel cell module 701 through the oxidant gas supply pipe 704.

The fuel cell module 701 can generate power by using the fuel gas (F) supplied through the fuel gas supply pipe 703 and the compressed oxidant gas (A) supplied through the oxidant gas supply pipe 704.

The fuel gas (F) and the oxidant gas (A) supplied to the fuel cell module 701 are discharged as exhaust fuel gas (F') and exhaust oxidant gas (A'), and supplied to the turbine 702b through the exhaust pipe 705. The turbine 702b rotates upon supply of the exhaust fuel gas (F') and the exhaust oxidant gas (A') thereto.

REFERENCE SIGNS LIST 10 pore
11 first structure
12 second structure
101, 101a, 101b, 301, 401, 501 single fuel cell
103 substrate tube
105, 311, 411, 511 power generation section
107, 306, 406 interconnector
109, 303, 403, 503 anode
110, 310 power non-generation section
111, 304, 404, 504 electrolyte
113, 305, 405, 505 cathode
115 lead film
117, 307, 407, 507 gas seal film
120 current collecting member
302 support substrate
309, 409 fuel gas flow path
402 conductive support substrate
502 conductive substrate tube
510 fuel cell module
512 seal tube plate
600, 700 power generation system
601, 701 fuel cell module
602, 702 gas turbine, turbocharger (rotating equipment)
602a, 702a compressor
602b, 702b turbine
602c electric generator
602d combustor
602e, 702e rotation axis
602f, 702f oxidant gas intake line
602g combustion gas supply line
603, 703 fuel gas supply pipe
604, 704 oxidant gas supply pipe
605 fuel gas exhaust pipe
606 oxidant gas exhaust pipe
705 exhaust pipe

The invention claimed is:

1. A high-temperature steam electrolysis cell comprising:
a hydrogen generation section in which an anode, an electrolyte, and a cathode are stacked;
a hydrogen non-generation section that does not include the hydrogen generation section; and
an oxygen-ion-insulating gas seal film arranged so as to cover at least a part of a surface of the hydrogen non-generation section, wherein
the gas seal film comprises a structure formed by sintering a material containing $MTiO_3$ wherein M is an alkaline earth metal element, and metal oxide excluding $TiO_2$ and YSZ,
the structure includes a first structure and a second structure that are different in composition, the first structure contains components derived from $MTiO_3$ in larger amounts than the second structure, the second structure contains a metal element contained in the metal oxide in a larger amount than the first structure and contains M and Ti derived from $MTiO_3$, and an area ratio of the second structure in the structure is not less than 1% and not more than 9%.

2. The high-temperature steam electrolysis cell according to claim 1, wherein the alkaline earth metal element is any one of Mg, Ca, Sr, and Ba.

3. The high-temperature steam electrolysis cell according to claim 1, wherein the metal oxide is any one of $B_2O_3$, $Al_2O_3$, $Ga_2O_3$, $In_2O_3$, $Tl_2O_3$, $Fe_2O_3$, $Fe_3O_4$, MgO, NiO, and $SiO_2$.

4. The high-temperature steam electrolysis cell according to claim 1, wherein the hydrogen non-generation section includes a lead film that is electrically connected to the hydrogen generation section at an end portion, the gas seal film is arranged so as to cover at least a part of a surface of the lead film.

5. The high-temperature steam electrolysis cell according to claim 1, wherein the hydrogen non-generation section includes an interconnector that electrically connects the hydrogen generation sections to each other, and the gas seal film is arranged so as to cover at least a part of a surface of the interconnector.

6. The high-temperature steam electrolysis cell according to claim 1, wherein the hydrogen non-generation section includes a lead film electrically connected to the hydrogen generation section at an end portion, an interconnector for electrically connecting the hydrogen generation sections to each other, and a portion other than the lead film and the interconnector, and the gas seal film is arranged so as to cover at least a part of a surface of the portion other than the lead film and the interconnector.

7. A high-temperature steam electrolysis cell comprising:
a hydrogen generation section in which an anode, an electrolyte, and a cathode are stacked;
a hydrogen non-generation section that does not include the hydrogen generation section; and
an oxygen-ion-insulating gas seal film arranged so as to cover at least a part of a surface of the hydrogen non-generation section, wherein
the gas seal film comprises a structure formed by sintering a material containing $M_{(1+x)}TiO_3$ wherein M is an alkaline earth metal element, and $0<x$, or $MTi_{(1+y)}O_3$ wherein M is an alkaline earth metal element, and $0<y$, and metal oxide excluding $TiO_2$ and YSZ,
the structure includes a first structure and a second structure that are different in composition, the first structure contains components derived from $M_{(1+x)}TiO_3$ or components derived from $MTi_{(1+y)}O_3$ in larger amounts than the second structure, the second structure contains a metal element contained in the metal oxide in a larger amount than the first structure and contains M and Ti derived from $M_{(1+x)}TiO_3$ or $MTi_{(1+y)}O_3$, and an area ratio of the second structure in the structure is not less than 1% and not more than 9%.

8. The high-temperature steam electrolysis cell according to claim 7, wherein the alkaline earth metal element is any one of Mg, Ca, Sr, and Ba.

9. The high-temperature steam electrolysis cell according to claim 7, wherein the metal oxide is any one of $B_2O_3$, $Al_2O_3$, $Ga_2O_3$, $In_2O_3$, $Tl_2O_3$, $Fe_2O_3$, $Fe_3O_4$, MgO, NiO, and $SiO_2$.

10. The high-temperature steam electrolysis cell according to claim 7, wherein the hydrogen non-generation section includes a lead film that is electrically connected to the hydrogen generation section at an end portion, the gas seal film is arranged so as to cover at least a part of a surface of the lead film.

11. The high-temperature steam electrolysis cell according to claim 7, wherein the hydrogen non-generation section includes an interconnector that electrically connects the hydrogen generation sections to each other, and the gas seal film is arranged so as to cover at least a part of a surface of the interconnector.

12. The high-temperature steam electrolysis cell according to claim 7, wherein the hydrogen non-generation section includes a lead film electrically connected to the hydrogen generation section at an end portion, an interconnector for electrically connecting the hydrogen generation sections to each other, and a portion other than the lead film and the interconnector, and the gas seal film is arranged so as to cover at least a part of a surface of the portion other than the lead film and the interconnector.

* * * * *